(12) United States Patent
Rowan et al.

(10) Patent No.: US 9,116,897 B2
(45) Date of Patent: Aug. 25, 2015

(54) TECHNIQUES FOR POWER ANALYSIS

(75) Inventors: Michael T. Rowan, Amesbury, MA (US); Christopher Rocca, Andover, MA (US); Michael D. Anthony, Wilmington, MA (US); Adam Matusiak, Lowell, MA (US); Michael Henriksen, Cambridge, MA (US); William White, Brookline, MA (US); Aloke Guha, Louisville, CO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 12/839,853

(22) Filed: Jul. 20, 2010

(65) Prior Publication Data

US 2011/0016342 A1 Jan. 20, 2011

Related U.S. Application Data

(60) Provisional application No. 61/226,998, filed on Jul. 20, 2009.

(51) Int. Cl.
G06F 1/00 (2006.01)
G06F 11/30 (2006.01)
G01R 21/00 (2006.01)
G01R 21/06 (2006.01)
G01R 25/00 (2006.01)
(Continued)

(52) U.S. Cl.
CPC ........ G06F 11/3006 (2013.01); G06F 11/3062 (2013.01); G06F 11/3096 (2013.01); G06F 1/3203 (2013.01); H04L 43/08 (2013.01); Y04S 40/168 (2013.01)

(58) Field of Classification Search
CPC ................................. G06F 1/26; G06F 1/3203
USPC ......................... 713/300–340; 702/60–62, 65
See application file for complete search history.

(56) References Cited

U.S. PATENT DOCUMENTS 6,167,524 A * 12/2000 Goodnow et al. .............. 713/300
6,487,508 B1 * 11/2002 Suzuki et al. .................... 702/61
(Continued)

FOREIGN PATENT DOCUMENTS

CN 1801046 A 7/2006
JP 2007020314 A * 1/2007 ................ H02J 3/00
(Continued)

OTHER PUBLICATIONS

Conte et al., "A technique to determine power-efficient, high-performance superscalar processors," System Sciences, 1995. Proceedings of the Twenty-Eighth Hawaii International Conference on, vol. 1, pp. 324-333, Jan. 3-6, 1995.*

(Continued)

*Primary Examiner* — Faisal M Zaman
(74) *Attorney, Agent, or Firm* — Lando & Anastasi, LLP

(57) ABSTRACT

Techniques for power analysis for data centers are disclosed. In one particular exemplary embodiment, the techniques may be realized as a method for power analysis for a plurality of computing platform components comprising receiving information associated with a component, retrieving, using a computer processor, electronically stored data associated with the component, estimating power usage of the component based at least in part on the stored data, and outputting an indicator of power usage.

25 Claims, 28 Drawing Sheets

(51) Int. Cl.
*G01R 27/00* (2006.01)
*G06F 1/32* (2006.01)
*H04L 12/26* (2006.01)

(56) References Cited

U.S. PATENT DOCUMENTS

| | | | |
|---|---|---|---|
| 6,622,097 | B2 | 9/2003 | Hunter |
| 6,975,947 | B2 * | 12/2005 | Oh .................... 702/60 |
| 7,039,532 | B2 | 5/2006 | Hunter |
| 7,051,215 | B2 | 5/2006 | Zimmer et al. |
| 7,188,001 | B2 | 3/2007 | Young et al. |
| 7,197,411 | B1 | 3/2007 | Gross et al. |
| 7,263,450 | B2 | 8/2007 | Hunter |
| 7,349,828 | B1 * | 3/2008 | Ranganathan et al. ....... 702/186 |
| 7,409,719 | B2 | 8/2008 | Armstrong, Jr. et al. |
| 7,596,476 | B2 | 9/2009 | Rasmussen et al. |
| 7,809,965 | B2 * | 10/2010 | Ziarnik et al. ................. 713/300 |
| 7,925,902 | B1 * | 4/2011 | Radcliffe et al. ............. 713/300 |
| 7,991,515 | B2 * | 8/2011 | Lyon et al. ..................... 700/300 |
| 7,991,592 | B2 | 8/2011 | VanGilder et al. |
| 8,041,521 | B2 * | 10/2011 | Bletsch et al. .................. 702/60 |
| 8,185,753 | B2 * | 5/2012 | Oe et al. ......................... 713/300 |
| 8,406,933 | B2 * | 3/2013 | Nagel et al. .................... 700/286 |
| 8,438,125 | B2 * | 5/2013 | Tung et al. ...................... 706/45 |
| 2002/0144162 | A1 * | 10/2002 | Tada et al. ...................... 713/300 |
| 2003/0115000 | A1 | 6/2003 | Bodas |
| 2004/0260490 | A1 | 12/2004 | Matsubayashi et al. |
| 2005/0228599 | A1 | 10/2005 | Culp et al. |
| 2006/0126309 | A1 | 6/2006 | Bolle et al. |
| 2006/0190745 | A1 * | 8/2006 | Matsushima et al. ......... 713/300 |
| 2006/0207268 | A1 | 9/2006 | Kelso et al. |
| 2006/0212726 | A1 * | 9/2006 | Wang et al. .................... 713/300 |
| 2007/0011473 | A1 * | 1/2007 | Sung ............................... 713/300 |
| 2007/0112694 | A1 | 5/2007 | Metcalfe |
| 2007/0124124 | A1 | 5/2007 | Aguilar et al. |
| 2008/0010521 | A1 | 1/2008 | Goodrum et al. |
| 2008/0052545 | A1 * | 2/2008 | Finkelstein et al. ........... 713/300 |
| 2008/0082851 | A1 * | 4/2008 | Zettler ............................. 713/340 |
| 2008/0165714 | A1 * | 7/2008 | Dettinger et al. ............. 370/311 |
| 2008/0186670 | A1 | 8/2008 | Lyon et al. |
| 2008/0219184 | A1 | 9/2008 | Fowler et al. |
| 2009/0019300 | A1 * | 1/2009 | Matton et al. .................. 713/324 |
| 2009/0138219 | A1 | 5/2009 | Bletsch et al. |
| 2009/0138313 | A1 | 5/2009 | Morgan et al. |
| 2009/0204826 | A1 * | 8/2009 | Cox et al. ....................... 713/320 |
| 2009/0248854 | A1 * | 10/2009 | Conway .......................... 709/224 |
| 2009/0276651 | A1 * | 11/2009 | Conroy et al. .................. 713/340 |
| 2009/0307670 | A1 * | 12/2009 | Kashyap et al. ............... 717/135 |
| 2009/0307708 | A1 * | 12/2009 | Archer et al. .................. 718/108 |
| 2010/0049995 | A1 * | 2/2010 | Casey et al. .................... 713/300 |
| 2010/0117625 | A1 * | 5/2010 | Botts ........................... 324/103 R |
| 2010/0211669 | A1 * | 8/2010 | Dalgas et al. ................... 709/224 |
| 2010/0211810 | A1 * | 8/2010 | Zacho ............................. 713/324 |
| 2010/0217454 | A1 * | 8/2010 | Spiers et al. .................... 700/300 |
| 2010/0241888 | A1 * | 9/2010 | Kaneko et al. ................. 713/324 |
| 2010/0292961 | A1 * | 11/2010 | Moss .............................. 702/188 |
| 2010/0312873 | A1 * | 12/2010 | Loboz et al. ................... 709/224 |
| 2011/0077795 | A1 | 3/2011 | VangGilder et al. |
| 2012/0204052 | A1 * | 8/2012 | Brown ............................ 713/340 |
| 2012/0290144 | A1 * | 11/2012 | Yuasa et al. .................... 700/295 |
| 2014/0298047 | A1 * | 10/2014 | Holler et al. .................... 713/300 |

FOREIGN PATENT DOCUMENTS

| | | | | |
|---|---|---|---|---|
| JP | 2013218568 A | * | 10/2013 | ............... G06F 1/32 |
| WO | 2007024396 A1 | | 3/2007 | |
| WO | WO 2011056007 A2 | * | 4/2011 | ............... G06F 9/50 |
| WO | WO 2013147555 A1 | * | 10/2013 | ............. H04L 12/24 |

OTHER PUBLICATIONS

Raghavendra et al., "Motivating co-ordination of power management solutions in data centers," Cluster Computing, 2007 IEEE International Conference on, pp. 473, Sep. 17-20, 2007.*

Conte et al., "System-level power consumption modeling and tradeoff analysis techniques for superscalar processor design," Very Large Scale Integration (VLSI) Systems, IEEE Transactions on, vol. 8, No. 2, pp. 129-137, Apr. 2000.*

Chen et al., "Temperature sensitivity analysis of system power profiles," Power Engineering Society Summer Meeting, 2001, vol. 2, pp. 854-859, 2001.*

Tyler Shears, "Data Centers, Power Consumption, and Global Warming—Will the web crash?," http://www.gimmiethescoop.com/data-center-power-consumption-global-warming-will-the-web-crash; May 10, 2008; 12 pages.

Paul Scheihing, DOE Data Center Energy Efficient Program: Save Energy Now; http://http://www1.eere.energy.gov/industry/saveenergynow/pdfs/doe_data_centers_presentation.pdf; Apr. 2009; pp. 1-25.

James M. Kaplan, et al., "Revolutionizing Data Center Energy Efficiency," http://www.mckinsey.com/clientservice/bto/pointofview/pdf/Revolutioning_Data_Center_Efficiency.pdf; McKinsey & Company; Jul. 2008; 15 pages.

Christian Belady; "Green Grid Data Center Power Efficiency Metrics: PUE and DCIE," The Green Grid; http://www.thegreengrid.org/~/media/White_Paper_6_-_PUE_and_DCiE_Eff_Metrics_30_December_2008.ashx?lang=en; Dec. 2008; pp. 1-9.

Stephen Lawson,"New server chips don't deliver, Facebook's tech chief says," http://www.computerworld.com/s/article/9134878/New_server_chips_dont_t_deliver_Facebook_s_tech_chief_says; Jun. 25, 2009; 5 pages.

PCT International Search Report for PCT/US2010/042596; ailed Sep. 16, 2010; 3 pages.

PCT Written Opinion of the International Searching Authority for PCT/US2010/042596; mailed Sep. 16, 2010; 7 pages.

Supplementary European Search Report from corresponding European Patent Application No. EP 10 80 2774 dated Oct. 19, 2012.

European Examination Report from corresponding European Application No. 10802774.9 dated May 27, 2015.

* cited by examiner

| 68 | 72 | 76 | 72 |
|---|---|---|---|
| 72 | 76 | 84 | 76 |
| 68 | 72 | 84 | 76 |
| 68 | 68 | 76 | 72 |

Global $V_t = 6.0$

| 72 | 76 | 76 | 76 |
|---|---|---|---|
| 72 | 76 | 84 | 76 |
| 72 | 76 | 84 | 76 |
| 72 | 76 | 84 | 76 |

Global $V_t = 5.3$

Fig. 23

| 88 | 88 | | 77 | 66 |
| 88 | 88 | | 77 | 66 |
| 88 | 88 | | 77 | 66 |
| 88 | 88 | | 77 | 66 |

Global $V_t$ = 10.7

| 88 | 66 | 88 | | 77 |
| 66 | 88 | 66 | | 88 |
| 88 | 66 | 88 | | 77 |
| 77 | 88 | 77 | | 88 |

Global $V_t$ = 11.6

*Same std deviation of temps set = 9.42

Fig. 24

Global $V_t$ = 6.0

| 68 | 72 | 76 | 72 |
|----|----|----|----|
| 72 | 76 | 84 | 76 |
| 68 | 72 | 84 | 76 |
| 68 | 68 | 76 | 72 |

Global $V_t$ = 5.3

| 72 | 76 | 84 | 76 |
|----|----|----|----|
| 72 | 76 | 84 | 76 |
| 72 | 76 | 84 | 76 |
| 72 | 76 | 84 | 76 |

Local $V_t$

| 6.2 | 4.5 | 4.7  | 4.6 |
|-----|-----|------|-----|
| 4.5 | 4.9 | 9.8  | 4.6 |
| 6.4 | 4.9 | 10.0 | 4.6 |
| 6.2 | 6.5 | 4.8  | 4.5 |

Local $V_t$

| 5.5 | 4.0 | 7.0 | 4.4 |
|-----|-----|-----|-----|
| 5.6 | 4.1 | 7.2 | 4.0 |
| 5.6 | 4.1 | 7.2 | 4.0 |
| 5.5 | 4.0 | 7.0 | 3.9 |

Fig. 25

TECHNIQUES FOR POWER ANALYSIS

CROSS-REFERENCE TO RELATED APPLICATIONS

The present application claims priority from U.S. Provisional Application No. 61/226,998 filed Jul. 20, 2009 entitled "Power Analysis," the disclosure of which is hereby incorporated by reference in its entirety.

FIELD OF THE DISCLOSURE

The present disclosure relates generally to power analysis and, more particularly, to techniques for power analysis for data centers.

BACKGROUND OF THE DISCLOSURE

Data Centers are quickly becoming one of the largest energy consumers especially in the US. While the demand is growing at an alarming rate, data center energy consumption is highly inefficient. To date, there appears to be no viable holistic approach to make the complete data center energy efficient while meeting business needs.

In view of the foregoing, it may be understood that there may be significant problems and shortcomings associated with current power analysis technologies for data centers.

SUMMARY OF THE DISCLOSURE

Techniques for power analysis for data centers are disclosed. In one particular exemplary embodiment, the techniques may be realized as a method for power analysis for a plurality of computing platform components comprising receiving information associated with a component, retrieving, using a computer processor, electronically stored data associated with the component, estimating power usage of the component based at least in part on the stored data, and outputting an indicator of power usage.

In accordance with other aspects of this particular exemplary embodiment, the component may comprise at least one of: a computer processor, electronic storage, and a networking component.

In accordance with further aspects of this particular exemplary embodiment, the techniques may further comprise iterating through the process for a plurality of components of a device, and aggregating power estimates for power usage of components of the device to provide an estimated power usage for the device.

In accordance with additional aspects of this particular exemplary embodiment, the device may comprise at least one of: a server, a network device, a host, and a storage device.

In accordance with additional aspects of this particular exemplary embodiment, further comprising iterating through the process for a plurality of devices in a zone.

In accordance with additional aspects of this particular exemplary embodiment, the techniques may further comprise receiving one or more measurements associated with a component, and estimating power usage of the component based at least in part on the one or more received measurements.

In accordance with additional aspects of this particular exemplary embodiment, the one or more measurements may comprise at least one of: a reading from a temperature sensor, a processor chip, a heat sink, a disk controller, a power supply, and a network component.

In accordance with additional aspects of this particular exemplary embodiment, the one or more measurements may comprise at least one of: CPU utilization, transaction rates, communication rates, configuration information, active processes, and a number of virtual machines.

In accordance with additional aspects of this particular exemplary embodiment, the techniques may further comprise estimating a thermal profile of a component based at least in part on one or more of the estimated power usage of the component and one or more received measurements.

In accordance with additional aspects of this particular exemplary embodiment, the techniques may further comprise estimating power usage based on the thermal profile.

In accordance with additional aspects of this particular exemplary embodiment, the estimated power usage based on the thermal profile may comprise using the thermal profile to estimate a cooling cost.

In accordance with additional aspects of this particular exemplary embodiment, the techniques may further comprise receiving one or more measurements from at least one of: a power distribution unit and a computer room air conditioner.

In accordance with additional aspects of this particular exemplary embodiment, the techniques may further comprise using the one or more received measurements to estimate at least one of: power usage and a thermal profile.

In accordance with additional aspects of this particular exemplary embodiment, receiving information associated with a component may comprise discovering a component via a network interface.

In accordance with additional aspects of this particular exemplary embodiment, discovering a component via a network interface may comprise using at least one of: Simple Network Management Protocol (SNMP), Storage Management Initiative-Specification (SMI-S), Intelligent Platform Management Interface (IPMI), Windows Management Instrumentation (WMI), Secure Shell (SSH), BACNet, and ModBus.

In accordance with additional aspects of this particular exemplary embodiment, discovering a component via a network interface may comprise discovery performed on a data center from a remote location.

In accordance with additional aspects of this particular exemplary embodiment, the techniques may further comprise accepting input for an unrecognized component in the event electronically stored data associated with the component is not retrieved.

In accordance with additional aspects of this particular exemplary embodiment, the techniques may further comprise discovering one or more logical elements associated with a component, and estimating power usage based at least in part on the one or more discovered logical elements.

In accordance with additional aspects of this particular exemplary embodiment, the one or more logical elements may comprise at least one of: an operating system component associated with a component, a process associated with a component, a virtual machine associated with a component, and an application associated with a component.

In accordance with additional aspects of this particular exemplary embodiment, electronically stored data associated with the component may comprise a database of at least one of: profiles of components, server arrays, computer room air conditioners, power distribution units, and data center physical infrastructure.

In accordance with additional aspects of this particular exemplary embodiment, the techniques may further comprise providing one or more recommendations based on at least one of: estimated power usage of a component, estimated power usage of a device, estimated power usage of a zone, estimated power usage of a data center, a thermal profile of a zone, and a thermal profile of a zone.

In accordance with additional aspects of this particular exemplary embodiment, the one or more recommendations may comprise at least one of: eliminating unutilized components, consolidating under-utilized components, upgrading inefficient components, replacing inefficient components, rearranging components within a geographical location to improve a thermal profile, and redistributing a work load across components within a geographical area to improve a thermal profile.

In accordance with additional aspects of this particular exemplary embodiment, the thermal profile may be estimated using Computational Fluid Dynamics.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for power analysis of a plurality of computing platform components, the article of manufacture comprising at least one non-transitory processor readable medium, and instructions stored on the at least one medium, wherein the instructions are configured to be readable from the at least one medium by at least one processor and thereby cause the at least one processor to operate so as to receive information associated with component, retrieve electronically stored data associated with the component, estimate power usage of the component based at least in part on the stored data, and output an indicator of power usage.

In yet another particular exemplary embodiment, the techniques may be realized as a system for power analysis of a plurality of computing platform components comprising one or more processors communicatively coupled to a network, wherein the one or more processors are configured to receive information associated with a component, retrieve electronically stored data associated with the component, estimate power usage of the component based at least in part on the stored data, and output an indicator of power usage.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 14 depicts a user interface for monitoring power metrics of a data center in accordance with an embodiment of the present disclosure.

FIG. 15 depicts a user interface for monitoring inventory of a data center in accordance with an embodiment of the present disclosure.

FIG. 23 depicts the use of indices to identify temperature issues in a data center in accordance with an embodiment of the present disclosure.

FIG. 24 depicts the use of indices to identify temperature issues in a data center in accordance with an embodiment of the present disclosure.

FIG. 25 depicts the use of indices to identify temperature issues in a data center in accordance with an embodiment of the present disclosure.

DETAILED DESCRIPTION OF EXEMPLARY EMBODIMENTS

Figure 1:
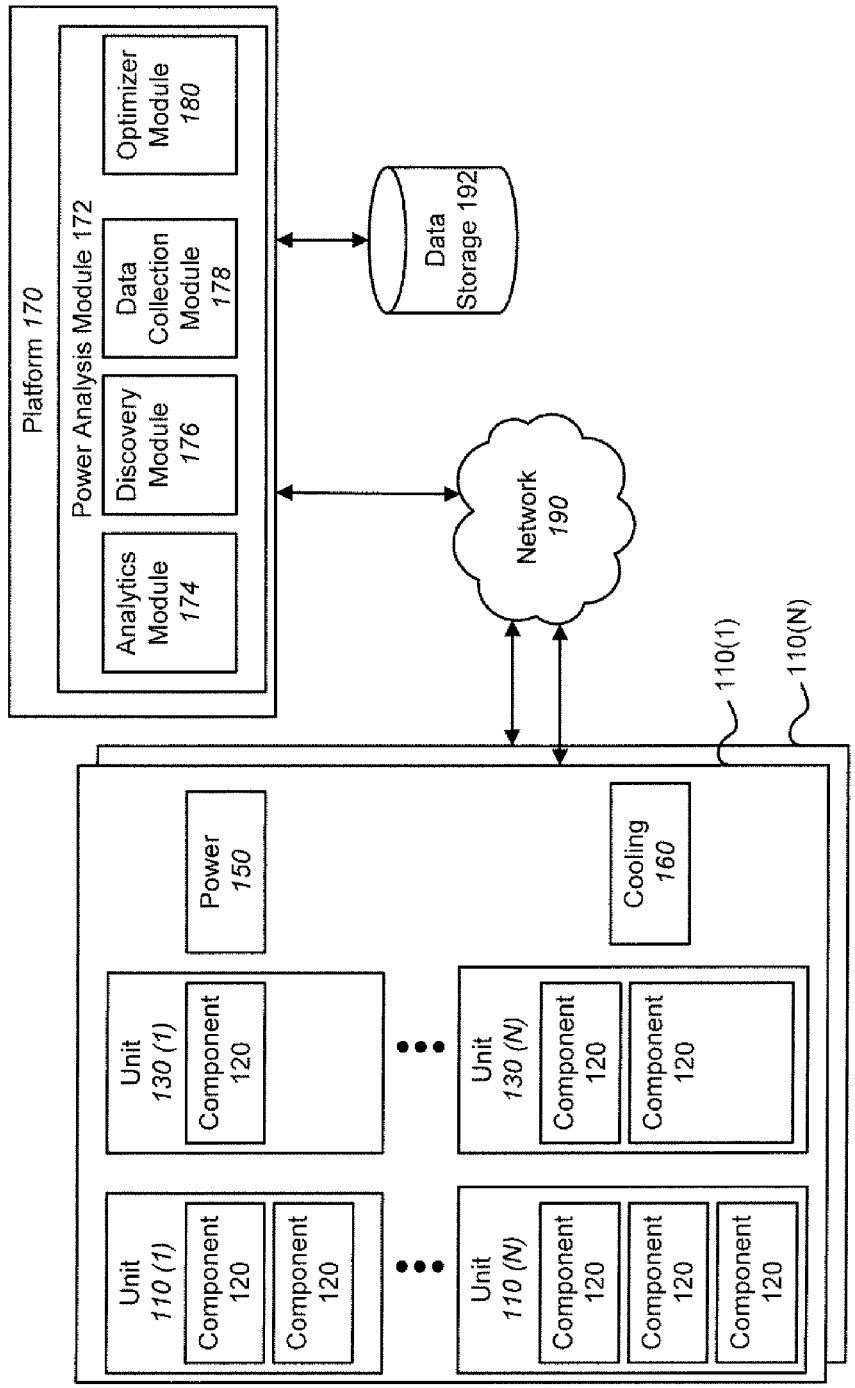
FIG. 1 shows a block diagram depicting a network architecture containing a platform for power analysis in accordance with an embodiment of the present disclosure.

FIG. 1 shows a block diagram depicting a network architecture 100 for power analysis in accordance with an embodiment of the present disclosure. FIG. 1 is a simplified view of network architecture 100, which may include additional elements that are not depicted. Network architecture 100 may contain data centers 110(1) to 110(N). Although traditionally larger facilities, for the purposes of the present disclosure, data centers may be understood to be large structures dedicated to supporting a plurality of computing platforms, server rooms, or even a closet supporting a single computing platform. Data center 110(1) may contain a plurality of units 110 and units 130. Units 110 and 130 may contain one or more components 120. Data center 110(1) may also contain power 150 and cooling 160. Other components and devices may be contained in data centers 110 (e.g., storage units, tape libraries, optical jukeboxes, and mainframe computers). Units 110 and 130 may be communicatively coupled to each other and/or other components. Units 110 and 130 may also be communicatively coupled to network 190.

According to some embodiments, units 110 and 130 may be racks for holding one or more computing devices and/or components (e.g., components 120). Units 110 may be arranged in a first aisle in a data center and units 130 may be arranged in a second aisle in a data center. Units 110 and 130 and components 120 may be supplied power by one or more of power 150. Units 110 and 130 and components 120 may dissipate heat into data center 110 and may be cooled by cooling 160.

Power 150 may be one or more Power Distribution Units (PDUs), Uninterruptable Power Supplies (UPS), Mains Distribution Units (MDUs), and/or generators. Power 150 may contain a network accessible interface for remote management and/or monitoring (e.g., an RS-232 interface and/or an Ethernet interface). Power 150 may provide data to and receive data from one or more devices in data center 110. Power 150 may also provide data to and receive data from platform 170 via network 190.

Cooling 160 may be one or more Computer Room Air Conditioners (CRACS) or other temperature monitoring equipment, temperature control equipment, and humidity control equipment. Cooling 160 may provide data to and receive data from one or more devices in data center 110. Cooling 160 may also provide data to and receive data from platform 170 via network 190.

Network 190 may be a local area network (LAN), wide area network (WAN), the Internet, a cellular network, a satellite network, or another network that permit communication between devices communicatively coupled to network 190. Network 190 may further include one, or any number, of the exemplary types of networks mentioned above operating as a stand-alone network or in cooperation with each other. Network 190 may utilize one or more protocols of one or more clients or servers to which they are communicatively coupled. Network 190 may translate to or from other protocols to one or more protocols of network devices. Although network 190 is depicted as one network, it should be appreciated that according to one or more embodiments, network 190 may comprise a plurality of interconnected networks.

According to some embodiments, components 120 may be computing platforms (e.g., server computers, server blades, network components, network storage devices or other devices). According to some embodiments, components 120 may be components of a larger device (e.g., cards for a network device or a server). Components 120 and/or units 110 and 120 may be used for one or more purposes (e.g., archival platforms, backup servers, network storage devices, media servers, email servers, document management platforms, enterprise search servers, and application servers).

The description below describes network elements, computers, and/or components of a system and method for power analysis that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Platform 170 may be communicatively coupled to network 190. According to some embodiments, platform 170 may be one or more hosts or computing platforms supporting power analysis module 172. Power analysis module 172 may analyze power usage of one or more of data centers 110, units 110, units 130, components 120, power 150, cooling 160, and subcomponents of one or more elements. Power analysis module 172 may also analyze thermal profiles (e.g., temperature, heat dissipation, etc.) of one or more of data centers 110, units 110, units 130, components 120, power 150, cooling 160, and subcomponents of one or more elements. According to some embodiments, power analysis module 172 may be located remotely from data centers 110 (e.g., at a service center). According to some embodiments, one or more components or modules of power analysis module 172 may be contained in data center 110 or co-located with data center 110.

Data storage 192 may be network accessible storage and may be local, remote, or a combination thereof to platform 170. Data storage 192 may utilize a redundant array of inexpensive disks ("RAID"), tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 192 may be a database, such as an Oracle database, a Microsoft SQL Server database, a DB2 database, a MySQL database, a Sybase database, an object oriented database, a hierarchical database, or other database. In some embodiments, data storage 192 may utilize flat file structures or XML for storage of data.

Data storage 192 may store vendor reliability and power specification profile data on a wide variety of data center assets. This data may be used to estimate power and reliability of assets. Data may include asset data, profile data, geospatial data, and dependency data of assets in one or more data centers. These types of data may be discovered, imported, or entered manually. Historical, analyzed, and reliability data may either be calculated results, collections of polled data from assets or a combination of both. Data storage 192 may maintain data by augmenting and/or amending data in a database based on information received from the data centers.

Power analysis module 172 may contain analytics module 174, discovery module 176, data collection module 178, and optimizer module 180.

Discovery module 176 may use one or more methods to identify and catalog data center resources. For example, discovery module 176 may use one or more of Simple Network Management Protocol (SNMP), Storage Management Initiative-Specification (SMI-S), Intelligent Platform Management Interface (IPMI), Windows Management Instrumentation (WMI), Secure Shell (SSH), BACNet, ModBus, and/or proprietary protocols to identify resources of a data center. According to some embodiments, discovery module 176 may provide a user interface allowing manual entry of resources and/or an API allowing a feed of resource information (e.g., an XML formatted feed). According to one or more embodiments, an snapshot tool, an export tool, or another tool may be provided to discover and export data to portable electronic storage from a data center that may not be remotely accessible (e.g., a secure facility).

Discovery module 176 may provide data to data collection module 178 and/or to data storage 192.

Data collection module 178 may monitor discovered resources of a data center to gather and store one or more resource metrics for analysis. Resource metrics may include, for example, CPU Performance data, memory usage, storage usage and performance, temperature sensors, process table performance, PDU power usage, UPS status information, CRAC unit status information, power conditioning status information, switch configuration and status information, and chiller status information. Resource metrics may be gathered using one or more protocols and/or APIs (e.g., SNMP). Metrics and other data may be stored in or retrieved from electronic storage (e.g., data storage 192).

Analytics module 174 may use stored metrics (e.g., metrics from data storage 192 to estimate or calculate power usage. Analytics module 174 may also aggregate power usage across one or more components (e.g., total power consumption for a server, a zone, or a data center). Analytics module 174 may determine or estimate a thermal profile of one or more components. Analytics module 174 may estimate a thermal profile based on received temperature data, estimated temperature data (e.g., based on power usage), other data (e.g., usage data or activity data), or a combination of the preceding. Analytics module 174 may estimate power requirements for a cooling unit based upon one or more thermal profiles or aggregated thermal profiles (e.g., aggregated thermal profiles for components of a server, for devices in a rack, for devices in a zone, for racks in a zone, for an aisle in a data center, for an entire data center, etc.). Analytics module 174 may use Computational Fluid Dynamics (CFD) to generate thermal profiles. According to some embodiments, Analytics module 174 may use data associated with logical configuration of one or more devices as discussed in greater detail in reference to FIG. 2 below.

Optimizer module 180 may use analyzed data from analytics module 174 to identify one or more issues. Optimizer module 180 may generate and provide one or more suggestions and/or solutions to identified issues. Optimizer module 180 may perform modeling to identify and illustrate the impact of suggested changes. According to some embodiments, one or more strategies may be used to identify improvements. For example, unutilized components may be identified (e.g., unused servers). If possible, unutilized components may be eliminated (e.g., powered down and/or removed from the data center). Under-utilized components may be combined and one or more components may be removed (e.g., a load may be shifted from a first server to a second server and the second server may be powered down and/or removed). Inefficient components may be upgraded or replaced (e.g., transactions per second or packets per second may be compared to power usage and heat emissions of other alternative equipment). Hot spots may be identified. Computational fluid dynamics may be used to generate models of temperatures within a data center. Placement of equipment (either relocation of existing equipment or placement of new equipment) may be recommended based on thermal maps of a zone, a plurality of zones, or a data center. Temperatures may be aggregated by zones. Users or administrators may customize zones to include components, a single device, a plurality of devices, a rack, a plurality of racks, an aisle in a data center, or across other regions or portions of a data center. Zones may aggregate components and/or devices vertically (e.g., up and down an entire rack), horizontally (e.g., all bottom bays or slots across a plurality of racks, or the top two bays or slots across a plurality of racks), or in other directions (e.g., across hot or cold aisles or along a single aisle). According to some embodiments, cooling vents, perforated floor tile, or other cooling structures may be altered in order to provide more efficient delivery of cooling to hotter areas of the data center, or to introduce thermal barriers to create separation between hot aisles and cold aisles. This may be performed in addition to or in place of one or more other strategies. According to some embodiments, Optimizer module 180 may use data associated with logical configuration of one or more devices as discussed in greater detail in reference to FIG. 2 below.

Platform 170 may be in communication with a number of data centers 110 to provide power analysis data to the data centers, and in some examples, received information related to configuration of the data centers, usage of the computing machines at physical and/or logical levels, and/or power usage and/or heat dissipation data.

In some examples, the information provided by Power analysis module 172 to a data center may permit administrators and/or software control processes at a data center to determine or estimate power usage and/or heat dissipation aspect of equipment in the data center. In some examples, this provides an association of power usage with individual computing machines, or aggregated into larger units such as groups of machines (e.g., entire racks). In some examples, the power usage may be more fine grained, for example, according to specific physical components in the machines, or according to factional share of different processes or applications executing on the computing machine.

Figure 2:
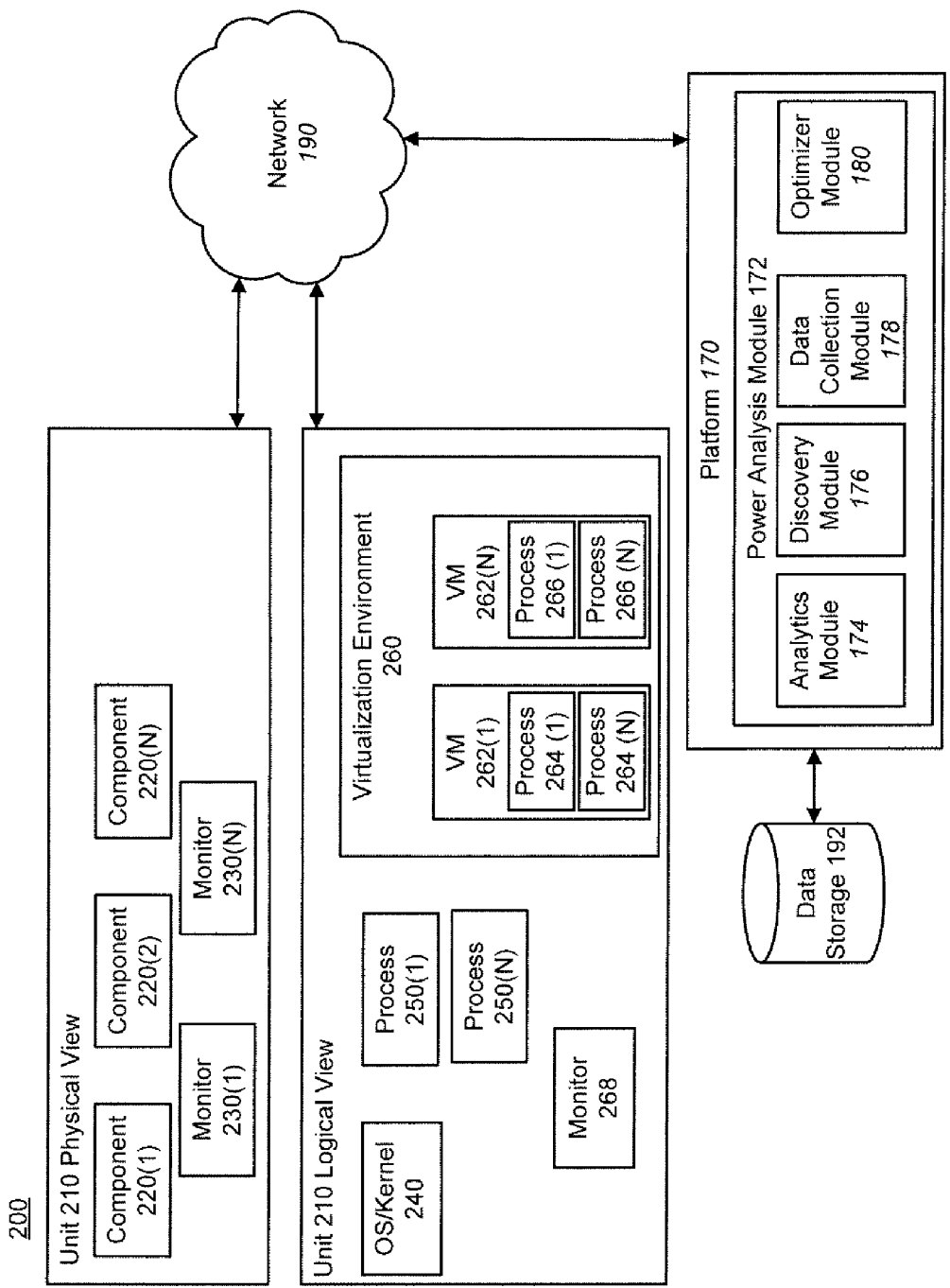
FIG. 2 shows a block diagram depicting a network architecture containing a platform for power analysis in accordance with an embodiment of the present disclosure.

Referring to FIG. 2, unit 210 physical view may be a physical view of a computing machine (e.g., a server computer. Unit 210 physical view may include a number of separate physical components 220, for example, processor chips, disk controllers, and semiconductor memory devices. In addition, unit 210 physical view may also include a number of monitors 230, which may monitor physical attributes of components, such as power usage (e.g., watts), heat dissipation (e.g., heat sink temperature), and operation characteristics (e.g., processor clock rate, disk rotation, data signaling rate). The monitors may be software accessible.

Continuing to refer to FIG. 2, the unit 210 logical view may be a logical view of the same physical machine or platform depicted in unit 210 physical view. Unit 210 logical view may include a number of logical/software components 240-266. For example, Unit 210 logical view may include operating system/kernel component 240 and processes 250. In one or more embodiments, Unit 210 logical view may include a monitor and/or a virtualization environment 260 (e.g., a "hypervisor") for virtual machine components 262, which may themselves include processes 264, 266, and other software components. Unit 210 logical view may include also include one or more software monitors 268, which may provide attributes of logical/software components, such as CPU utilization, transaction rates (e.g., database queries per second), and communication rates (e.g., message or packets at various protocol level), as well as configuration information, such as identities of active processes, virtual machines, etc.

Information from the monitors 230 and monitors 268 may be passed to a platform 170, which may includes a power analysis module 172. According to some embodiments, this module may estimate power usage of physical and/or logical components and/or computing machines/software environments. The power analysis module 172 may use data storage 192, which may include statistical parameters estimated to provide a mapping from usage data to estimated power usage for the various elements represented in data storage 192. The power estimates may be passed to an optimizer module 180, which may provide a tabular or graphical representation of the estimated power usage.

According to some embodiments, platform 170 may also include an analytics module 274, which may be used to update data storage 192. For example, data for a new element (e.g., a previously unseen component that is found in a data center) may be estimated based on data received from a data center, or statistical parameters for an existing component may be refined based on additional monitoring data received from data centers. That is, data storage 192 may initially have relatively inaccurate or over-conservative estimates for a component for which little data is available, and an analysis component may be used to incorporate the information for data center monitoring to improve the accuracy of the estimates.

As an example, machine monitoring data from monitors 230 may be associated with a particular computing machine (e.g., unit 210). This associated data may be provided to a power analytics module 174. The machine monitoring data may include data for physical components and/or data for logical components (e.g., gathered from monitors 230 and 268, respectively). The power analytics module 174 may make use of a power profile in data storage 192, which may include data associated with each type of component (e.g., associated with the identifier of the type of component). This may allow a mapping from monitored data to the estimated power consumption of each component (e.g., based on a parametric function, such as a polynomial curve fit). The output of power analytics module 174 may be a total power as well as an allocation of the power to the various physical and/or logical components.

According to some embodiments, the power estimates associated with multiple computing machines may be combined with location data for the machines, to determine a spatial power dissipation profile for the data center. In some example, the spatial profile may also take into account location of cooling devices to determine an estimated heat dissipation or temperature profile.

It should be understood that while in some embodiments the analysis and power prediction functions may be centralized, with data centers providing monitoring data to the centralized functions, where power profile data may be combined to determine estimated power usage. In other embodiments, the power profile data may be distributed to power estimation components that may be local to the data center, or even local to individual computing machines. In some such embodiments, monitoring data, or aggregation or processed forms of such data may be provided to a central computing platform where the power profile data may be augmented and/or refined.

Figure 3:
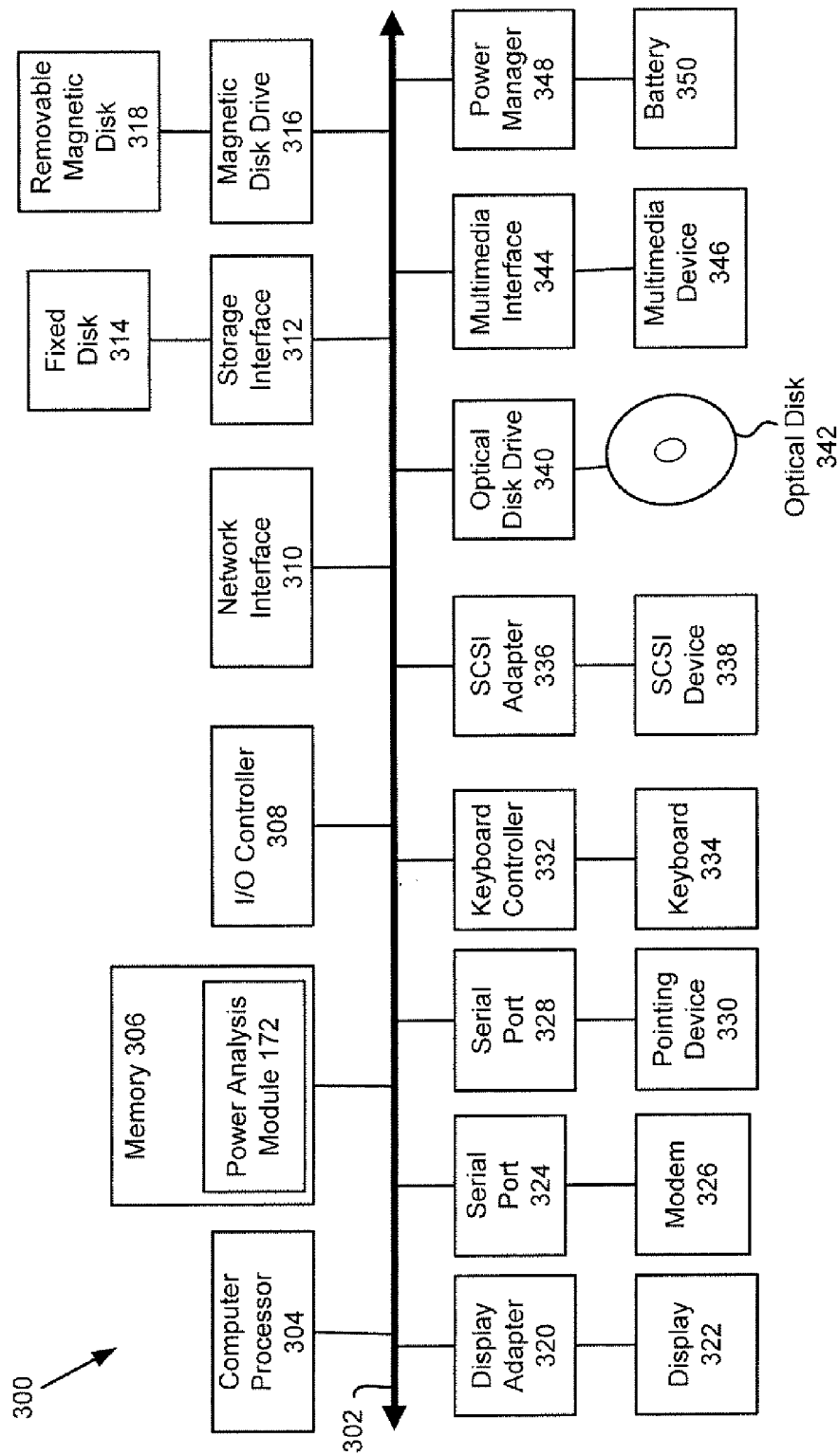
FIG. 3 depicts a block diagram of a computer system in accordance with an embodiment of the present disclosure.

FIG. 3 depicts a block diagram of a computer system 300 in accordance with an embodiment. Computer system 300 may be suitable for implementing techniques in accordance with one or more embodiments. Computer system 300 may be a client, a server, a network node, a gateway, or other network capable processing platform. Computer system 300 may include a bus 302 which may be communicatively coupled to one or more components of computer system 300, such as, for example, computer processor 304, memory 306 (e.g., RAM (Random Access Memory), ROM (Read Only Memory), flash RAM, etc.), Input/Output (I/O) controller 308, network interface 310, storage interface 312 providing connectivity fixed disk 314, magnetic disk drive 316 operative to receive removable magnetic disk 318, display 322 connected via display adapter 320, serial ports 324 and 328, keyboard 334 via keyboard controller 332, SCSI adapter 336 operative to connect to SCSI device 338 (e.g., storage, a scanner, etc.), optical disk drive 340 operative to receive an optical disk 342, and multimedia device 346 (e.g., a speaker, a camera, a microphone, etc.) coupled via multimedia interface 344. Other components may include pointing device 330 (e.g., a mouse, trackball, joystick, etc., coupled to bus 302 via serial port 328), a modem 326 (coupled to bus 312 via serial port 324), power manager 348, and battery 350.

Bus 302 may allow data communication between computer processor 304 and memory 306 and one or more other components. According to some embodiments, memory 306 may be the main memory into which an operating system and one or more application programs may be loaded. Applications or other software may be stored on and accessed via a computer readable medium, such as a hard disk drive (e.g., fixed disk 314), an optical drive (e.g., optical drive 340), a magnetic disk drive 316, or other storage medium (e.g., network accessible storage accessed via network interface 310). For example, extension assignment module 114 may be resident in memory 306.

Storage interface 312 may connect to a standard computer readable medium for storage and retrieval of information, such as a fixed disk drive 314. Fixed disk drive 314 may be a part of computer system 300 or may be separate and accessed through other interface systems. Modem 326 may provide a direct connection to a remote server via a telephone link or to the Internet via an Internet service provider (ISP). Network interface 310 may provide a direct connection to a remote server via a direct network link to the Internet via a POP (point of presence).

Power manager 348 may monitor a power level of battery 350. According to some embodiments, battery 350 may be an Uninterruptable Power Supply (UPS) located either local to or remote from computer system 300. In such embodiments, power manager 348 may provide information about a power level of an UPS.

Other devices or components may be connected in a similar manner (e.g., digital cameras, Uninterruptable Power Supplies, etc). The components of FIG. 3 are not required and one or more of the illustrated components may not be present in an embodiment. In some embodiments, multiple components of a same type may be included (e.g., multiple computer processors 304, multiple storage interfaces 312, etc.). The devices and subsystems may be interconnected in different ways from that shown in FIG. 3. Code to implement one or more embodiments may be stored in computer-readable storage media such as one or more of memory 306, fixed disk 314, optical disk 342, or removable magnetic disk 318. Code to implement the one or more embodiments may also be received via one or more interfaces and stored in memory. The operating system provided on computer system 300 may be MS-WINDOWS®, UNIX®, Linux®, Mac OS®, Mac OS X®, or another operating system.

Figure 4:
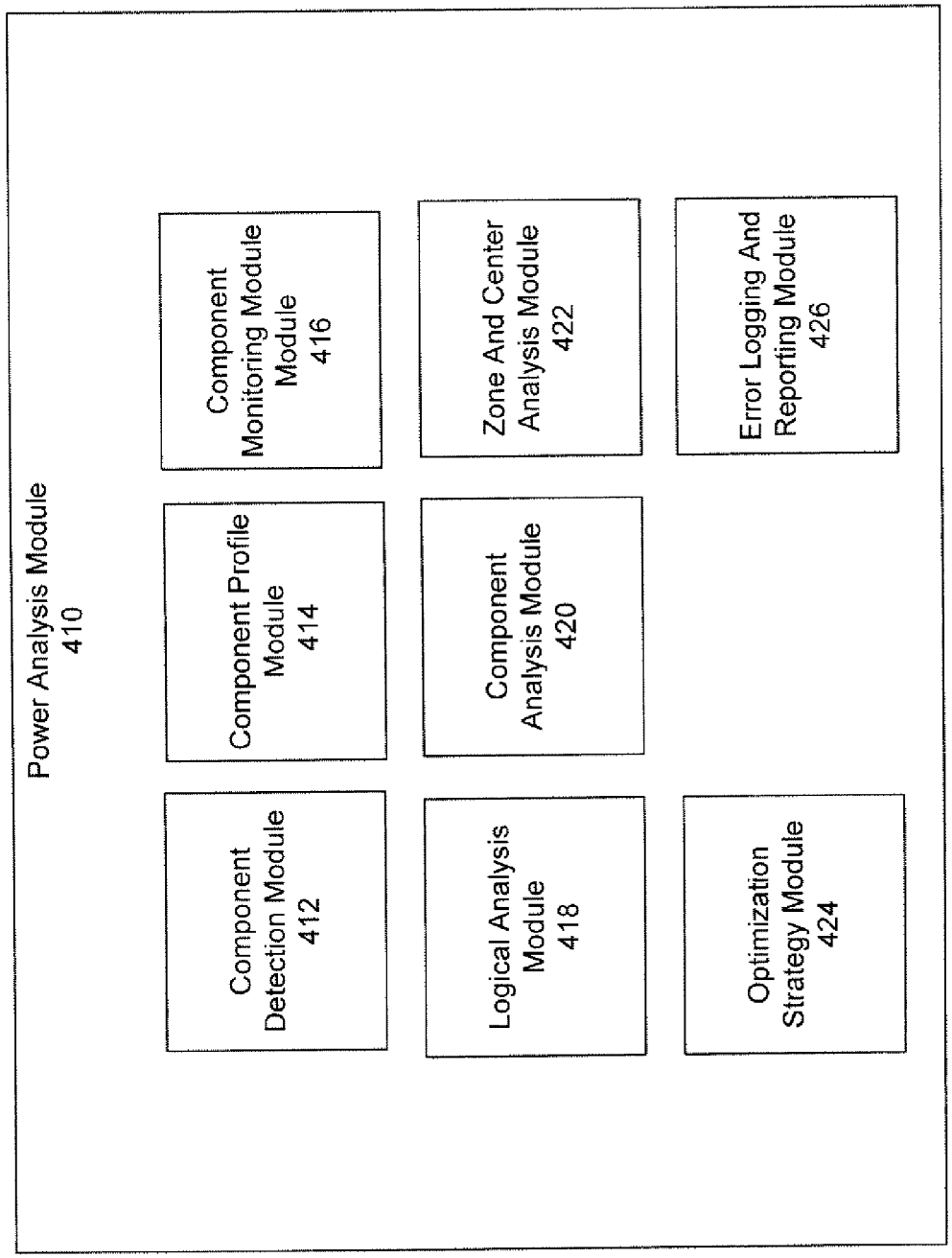
FIG. 4 shows a module for power analysis in accordance with an embodiment of the present disclosure.

Referring to FIG. 4, there is shown a power analysis module 410 in accordance with an embodiment of the present disclosure. As illustrated, the power analysis module 410 may contain one or more components including component detection module 412, component profile module 414, component monitoring module 416, logical analysis module 418, component analysis module 420, zone and center analysis module 422, optimization strategy module 424, and error logging and reporting module 426.

Component detection module 412 may use one or more methods to identify and catalog data center resources. For example, Component detection module 412 may use one or more of Simple Network Management Protocol (SNMP), Storage Management Initiative-Specification (SMI-S), Intelligent Platform Management Interface (IPMI), Windows Management Instrumentation (WMI), Secure Shell (SSH), BACNet, ModBus, and/or proprietary protocols to identify resources of a data center. According to some embodiments, Component detection module 412 may provide a user interface allowing manual entry of resources and/or an API allowing a feed of resource information (e.g., an XML formatted feed). According to one or more embodiments, an snapshot tool, an export tool, or another tool may be provided to discover and export data to portable electronic storage from a data center that may not be remotely accessible (e.g., a secure facility).

Component profile module 414 may obtain and store vendor reliability and power specification profile data on a wide variety of data center assets. This data may be used to estimate power and reliability of assets. Data may include asset data, profile data, geo-spatial data, and dependency data of assets in one or more data centers. These types of data may be discovered, imported, or entered manually. Historical, analyzed, and reliability data may either be calculated results, collections of polled data from assets or a combination of both. Component profile module 414 may maintain data by augmenting and/or amending data in a database based on information received from the data centers.

Component monitoring module 416 may monitor discovered resources of a data center to gather and store one or more resource metrics for analysis. Resource metrics may include, for example, CPU Performance data, memory usage, storage usage and performance, temperature sensors, process table performance, PDU power usage, UPS status information, CRAC unit status information, power conditioning status information, switch configuration and status information, and chiller status information. Resource metrics may be gathered using one or more protocols and/or APIs (e.g., SNMP). Metrics and other data may be stored in or retrieved from electronic storage (e.g., data storage 192).

Logical analysis module 418 may use stored metrics (e.g., metrics from data storage 192) to estimate or calculate power usage. Logical analysis module 418 may use data associated with logical configuration of one or more devices (e.g., CPU utilization, transaction rates (e.g., database queries per second), and communication rates (e.g., message or packets at various protocol level), as well as configuration information, such as identities of active processes, virtual machines, etc.) Identities of active processes may be used to estimate power usage based on historical data, profile data, or other data (e.g., a database reporting process may be known to be an intensive power using process involving a large computational load and heavy disk access). Logical utilization may be mapped to one or more physical components or devices to estimate power usage, heat dissipation, and other factors affecting data center cost and performance.

Component analysis module 420 may use stored metrics (e.g., metrics from data storage 192) to estimate or calculate power usage for one or more components. Component analysis module 420 may use received actual measurements, historical data, and profile data (e.g., manufacturers' specifications or other statistics associated with a component or device) to calculate and/or estimate power usage and thermal properties for components or devices. Power usage for a device or component may be used to estimate heat dissipation and associated cooling costs.

Zone and center analysis module 422 may aggregate power usage across one or more components, devices, or portions of a data center (e.g., total power consumption for a server, a zone, or a data center). Zone and center analysis module 422 may determine or estimate a thermal profile of one or more components. Zone and center analysis module 422 may estimate a thermal profile based on received temperature data, estimated temperature data (e.g., based on power usage), other data (e.g., usage data or activity data), or a combination of the preceding. Zone and center analysis module 422 may estimate power requirements for a cooling unit based upon one or more thermal profiles or aggregated thermal profiles (e.g., aggregated thermal profiles for components of a server, for devices in a rack, for devices in a zone, for racks in a zone, for an aisle in a data center, for an entire data center, etc.). Zone and center analysis module 422 may use Computational Fluid Dynamics (CFD) to generate thermal profiles.

Optimization strategy module 424 may use analyzed data to identify one or more issues. Optimization strategy module 424 may generate and provide one or more suggestions and/or solutions to identified issues. Optimization strategy module 424 may perform modeling to identify and illustrate the impact of suggested changes. According to some embodiments, one or more strategies may be used to identify improvements. For example, unutilized components may be identified (e.g., unused servers (i.e., "zombie servers")). If possible, unutilized components may be eliminated (e.g., powered down and/or removed from the data center). Underutilized components may be combined and one or more components may be removed (e.g., a load may be shifted from a first server to a second server and the second server may be powered down and/or removed). Inefficient components may be upgraded or replaced (e.g., transactions per second or packets per second may be compared to power usage and heat emissions of other alternative equipment). Hot spots may be identified. Computational fluid dynamics may be used to generate models of temperatures within a data center. Temperatures may be aggregated by zones. Users or administrators may customize zones to include components, single device, a plurality of devices, a rack, a plurality of racks, an aisle in a data center, or across other regions or portions of a data center. Zones may aggregate components and/or devices vertically (e.g., up and down an entire rack), horizontally (e.g., all bottom bays or slots across a plurality of racks, or the top two bays or slots across a plurality of racks), or in other directions (across hot or cold aisles or along a single aisle). According to some embodiments, Optimization strategy module 424 may use data associated with logical configuration. Output from Optimization strategy module 424 may be user displays (e.g., web pages), reports, alerts (SMS messages, emails, etc.), and other electronic communications.

Error logging and reporting module 426 may produce logs, reports, or other information associated with power analysis of computing platform components.

Figure 5:
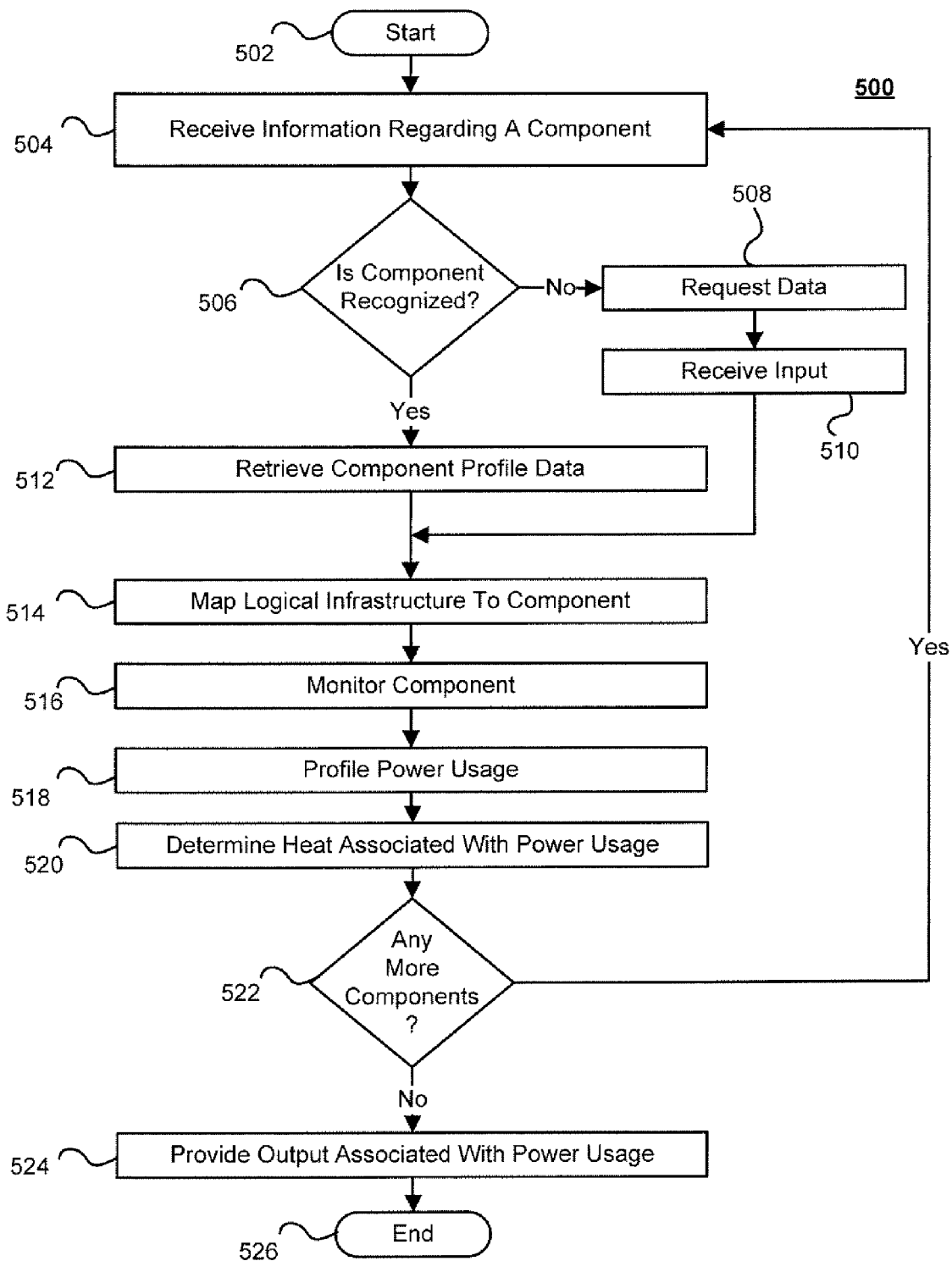
FIG. 5 depicts a method for power analysis in accordance with an embodiment of the present disclosure.

Referring to FIG. 5, there is depicted a method 500 for power analysis of computing platform components in accordance with an embodiment of the present disclosure. At block 502, the method 500 may begin.

At block 504 information may be received regarding a component. Information may be discovered or may be received from a data center output or via user entry. Discovery may use one or more methods to identify and catalog data center resources. For example, discovery may use one or more of Simple Network Management Protocol (SNMP), Storage Management Initiative-Specification (SMI-S), Intelligent Platform Management Interface (IPMI), Windows Management Instrumentation (WMI), Secure Shell (SSH), BACNet, ModBus, and/or proprietary protocols to identify resources of a data center. According to some embodiments, discovery processes may provide a user interface allowing manual entry of resources and/or an API allowing a feed of resource information (e.g., an XML formatted feed). According to one or more embodiments, an snapshot tool, an export tool, or another tool may be provided to discover and export data to portable electronic storage from a data center that is not remotely accessible (e.g., a secure facility).

At block 506, the method 500 may determine if a discovered component is recognized. The method 500 may access an electronic repository to attempt to match a discovered component using one or more discovered attributes. If a component is recognized the method 500 may continue at block 512. If a component is not recognized, the method may continue at block 508.

At block 508 data may be requested regarding a discovered but unrecognized component. The method 500 may send an electronic communication to a user or an administrator (e.g., an SMS message, an email), may list the unrecognized component on a user interface or a report, or may otherwise prompt a user or administrator for profile data associated with an unrecognized component.

At block 510, data may be received via user input or another interface (e.g., a refresh of known profile data updated with new manufacturer's specifications). After profile data is received, the method may update a profile data repository and otherwise process received profile data. The method may then continue at block 514.

At block 512, component profile data may be retrieved from an electronic repository. Profile data may include historical and/or estimated power usage, thermal properties (e.g., heat generated), associated logical processes (e.g., drivers), and other data.

At block 514, logical infrastructure or components may be mapped to a physical component. For example, kernel or O/S components, processes, threads, applications, virtual machines, and/or processes, threads and applications of virtual machines may be associated with a physical component. For example, a reporting processes may be associated with a load on a disk array or other electronic storage to facilitate estimation of power usage and heat generated.

At block 516 physical and/or logical components may be monitored. Monitoring may gather data at one or more levels of granularity (e.g., processor, disk controller, server blade, rack, zone, data center aisle, data center, business unit/client/cost center across a plurality of data centers, etc.)

At block 518 power usage and thermal properties may be profiled based on stored data. Power usage may also be calculated based on monitored logical and physical components. Measured power usage and/or profiled power usage may be averaged, aggregated, or otherwise processed to determine power usage outputs at one or more levels of granularity. The types and numbers of calculations and estimations may depend on availability of measured metrics, potential intrusiveness and impact or load to obtain such metrics, the availability of profiled or historical data and other factors. To the extent possible load for obtaining data may be minimized in a data center (e.g., collected at lower peak usage times and estimated at higher loads, or collected but transmitted at lower peak usage times).

At block 520 heat generated and dissipated by one or more components may be estimated based on power usage measurements, power usage estimates, heat profile data, and other factors. Computational fluid dynamics calculations may be used.

At block 522, the method 500 may determine if other components remain to be discovered and/or analyzed. If other components remain to be discovered and/or analyzed the method may return to block 504. If no other components remain, the method may continue at block 524.

At block 524 the method 524 may provide output associated with power usage. Output may be user displays (e.g., web pages), reports, alerts (SMS messages, emails, etc.), and other electronic communications.

At block 526, the method 500 may end.

Figure 6:
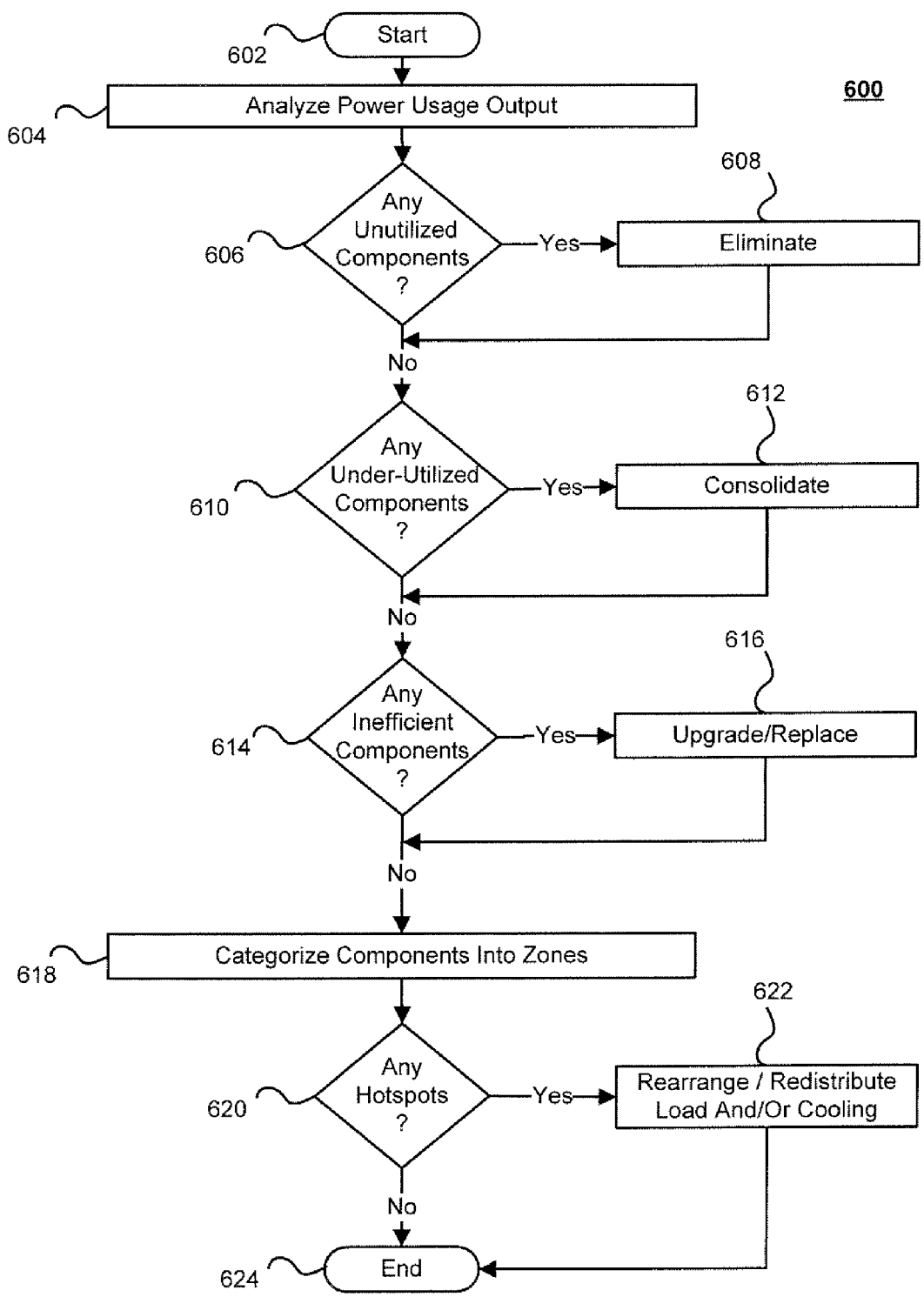
FIG. 6 depicts a method for power analysis in accordance with an embodiment of the present disclosure.

Referring to FIG. 6, there is depicted a method 600 for power analysis of computing platform components in accordance with an embodiment of the present disclosure. At block 602, the method 600 may begin.

At block 604, the method may analyze power usage and temperature output to identify one or more problems, hot spots, and/or optimization strategies. Modeling may be performed to identify and illustrate the impact of suggested changes. According to some embodiments, one or more strategies may be used to identify improvements. One or more metrics may be used to determine utilization, efficiency and component factors. For example, CPU utilization, disk utilization and access patterns, data throughput and other factors may be measured against power usage and/or heat dissipation.

At block 606, the method may determine whether unutilized components may be identified (e.g., unused servers). If unutilized components are identified the method may continue at block 608. If unutilized components are not identified, the method may continue at block 610.

At block 608 unutilized components may be eliminated (e.g., powered down and/or removed from the data center).

At block 610, the method may determine if there are any under-utilized components. If there are under-utilized components, the method may continue at block 612. If there are no under-utilized components the method may continue at block 614.

At block 612, under-utilized components may be combined and one or more components may be removed (e.g., a load may be shifted from a first server to a second server and the second server may be powered down and/or removed).

At block 614, the method may determine whether any inefficient components are detected. If inefficient components are detected, the method may continue at block 616. If one or more inefficient components are not detected the method may continue at block 618.

At block 616, inefficient components may be upgraded or replaced (e.g., transactions per second or packets per second may be compared to power usage and heat emissions of other alternative equipment).

At block 618, component and/or devices may be categorized and/or organized into zones. Analysis may be grouped or aggregated by the identified zones. Hot spots may be identified. Computational fluid dynamics may be used to generate models of temperatures within a data center.

At block 620 it may be determined if there are any hot spots. If hot spots are identified the method 600 may continue at block 622. If no hot spots are identified, the method may end at block 624.

At block 622, placement of equipment (either relocation of existing equipment or placement of new equipment) may be recommended based on thermal maps of a zone, a plurality of zones, or a data center. According to some embodiments, cooling vents, perforated floor tile, or other cooling structures may be altered in order to provide more efficient delivery of cooling to hotter areas of the data center, or to introduce thermal barriers to create separation between hot aisles and cold aisles. This may be performed in addition to or in place of one or more other strategies.

At block 624, the method 600 may end.

According to some embodiments, data center power analysis software may discover assets in the data center and periodically collect utilization and environmental data in order to provide analytics, optimizations, and control mechanisms. These mechanisms may work collaboratively to optimize power, cooling, space, and reliability in order to maximize data center efficiency. In addition, one or more portions of this environmental data may be mapped onto applications. This may provide an alternative business level view of data center efficiency and usage.

According to some embodiments, the software may discover, collect, analyze, and then optimize data centers components. According to some embodiments, in order to adhere to this flow the software architecture may be organized into three main logical processing domains. These processing domains may be the Discovery Engine, Data Collector, and Analytics Engine. The logical view of the processing domains may be a natural boundary by which feature sets may be defined with context and work may be divided. Additionally from a functional point of view, each of these domains may be independent of the others with the ability to be easily teased apart or replaced with minimal impact on the rest of the system.

According to some embodiments, the architecture may be able to support a product that may have to handle millions of data center elements. This may include polled data, analytics, optimization, control, discovery, and/or reporting. This in turn may require elements of the architecture to operate in a distributed environment such that work can be divided. Each component should be designed with these factors in mind.

According to one or more embodiments, the architecture may be flexible enough to allow major pieces of functionality to be replaced without affecting the rest of the system. This may utilize well defined interfaces and abstraction layers between major components of the system. In addition it may be likely that a set of analysis features may change very frequently. As a result a framework may exist to allow for rapid deployment and possibly geographically dispersed development of new analysis features. Lastly, some analysis features in the system may be partially hosted services, while some may be local only. The analysis framework may be able to handle both of these models.

Many of the product features such as Computational Fluid Dynamics (CFD) analysis and certain reports may take on the order of hours to run, according to some embodiments. Other features may take seconds. With respect to architecture in general, performance considerations and practices may be left to the design of the component as each one may have different performance requirements. Each feature or system component may operate in such a way as to not interfere with critical tasks such as polling and interactive tasks that may require quick responses. Additionally, software may have a minimal impact on the entities it is monitoring.

Figure 7:
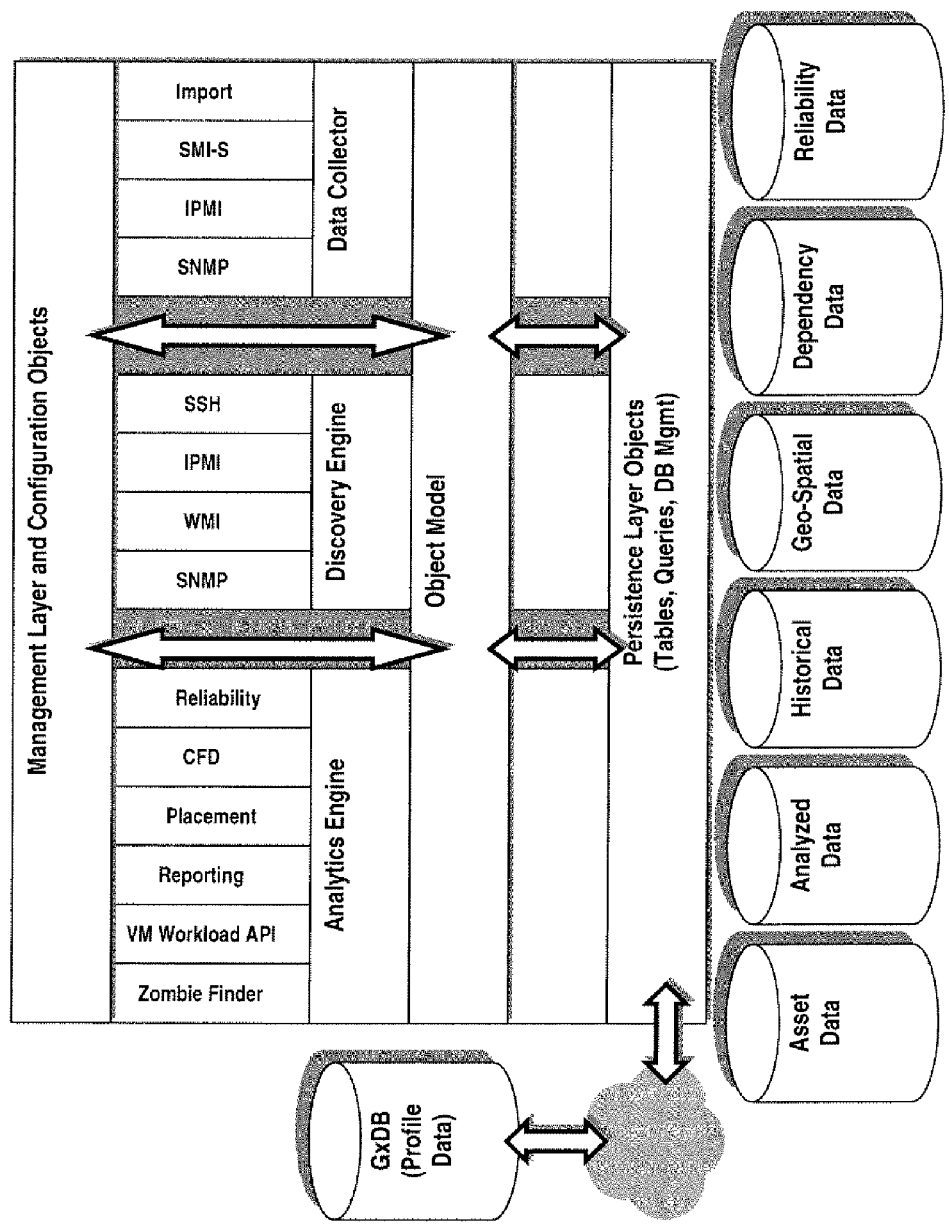
FIG. 7 depicts objects and data of a power analysis system in accordance with an embodiment of the present disclosure.

According to some embodiments, the logical view of one or more major components in the architecture may be categorized into several distinct areas of functionality and responsibility. FIG. 7 outlines the major components according to one or more embodiments. Each component of FIG. 7 is described in further detail below.

The Discovery Engine may be the entity responsible for discovering objects in the data center and storing them in the system's asset database. These objects may include both physical and logical assets. The discovery engine may be able to support a number of protocols and methods to accomplish this including but not limited to SNMP, SMI-S, IPMI, WMI, SSH, BACNet, ModBus, and/or proprietary protocols.

The Data Collector may periodically collect utilization and environmental data pertinent to the objects in the asset database. Much like the discovery engine the data collector may be able to support a wide and changing range of protocols and methods.

The Analytics Engine may provide a comprehensive framework and set of supporting facilities for analysis, optimization and control features. The framework may be a pipe and filter design that maximizes code reuse and allows for rapid and independent development of features.

The Object Model may be a representation of assets, associated data, and relationships between assets stored in electronic storage (e.g., a database). This layer may cut across all three processing domains. This may provide a common method of abstraction and access to all three of the processing domains.

Management layer and configuration objects of FIG. 7 may be the management representation of the object model. It may contain objects for communicating status, configuration, synchronization, and control information between User Interfaces (UIs) and one or more other portions of the system. One of its main purposes may be to allow the management view of the object model to vary from the processing domains' view. Included at this level may be a translation layer from object model to management model.

The persistence layer objects of FIG. 7 may be the persistence layer representation of the object model. It may be the layer responsible for translating between object model and persistence layer representation objects. It may also contain logic for table management, queries, and database administration.

According to some embodiments, the GxDB may be the hosted service that may provides the system with vendor reliability and power specification profile data on a wide variety of data center assets. This data may be used in conjunction with the discovery and analytics engines to estimate power and reliability without periodic collection of actual asset utilization data. The analytics engine may contain the facilities for communication with and logic for querying information on specific asset types in the GxDB.

According to at least one embodiment, there may be two main types of data stored by the system. The GxBD may contain data that describes assets and their characteristics and data that is collected or calculated periodically. Asset Data, Profile Data, Geo-Spatial Data, and Dependency Data may all describe the assets in the data center. These types of data may be discovered, imported, or entered manually. The Historical, Analyzed, and Reliability Data may either be calculated results written by the analytics engine or collections of polled data from the assets discovered in the data center.

According to some embodiments, data in the system may be organized into three main logical models. These models may be the Object Model, Persistence Model, and the Management Layer Model. These models may allow for both abstraction and independent data organization at different levels of the software. This may also allow each layer to change independent of the others with only thin translation layers affected.

The data model may scale horizontally to represent a wide variety of devices and associated data for those devices. It may also be able to accommodate a wide range of collected and calculated data. The amount of data collected stored over time may be in the tens of terabytes range. The data may be organized and partitioned in such a way to allow for quick access with little contention.

In at least one embodiment, the data model may be flexible enough to accommodate changes to different layers of the model without affecting the rest of the model layers. For example, a change in the persistence layer may not affect the management layer model or any other code accept for the thin translation layer that copies data between the models.

Performance in this context may refer to translation of objects from one layer to another as well as data access. In general the copying of device attributes between layers may be a small amount of data. However, the copying of collected data between layers may be avoided due to the large volume. In addition, access to data may be able to accommodate at least a few hundred transactions simultaneously.

The Object Model Layer may be a view shared and used directly by the Collection Engine, Discovery Engine, and Analytics Engine. It may be comprised of seven different major categories of data: Asset Data, Historical Data, Analyzed Data, Geo-Spatial Data, Reliability/Power Profile Data, Calculated Reliability Data, and Dependency Data. Each of these categories is described in more detail in the sections that follow.

Asset Data may describe software and hardware assets in the data center and how they relate to each other. It may include attributes such as address of a device, method of accessing the device, and the type of the device. It may be meta-data that answers the question "what is this and how do I address it?"

Historical Data may be the actual usage data collected from assets. For example, for a disk drive it may be a number of blocks transferred and for a CPU it may be percentage of time not idle. This data may be collected at periodic intervals over time and may be used to derive other data such as actual power utilization.

Analyzed Data may refer generically to data that has been calculated from a combination of other types of data. For example, CFD Analysis data may be calculated using a combination of Asset, Geo-Spatial, and one of either Historical or Profile Data.

Geo-Spatial Data may be meta-data that describes the physical dimensions and placement of an asset or even a non-asset such as a door or window. For example, this data may be used to calculate environmental aspects such as airflow and temperature in a confined space.

Profile Data may be meta-data that describes an asset's power/temperature footprint and the reliability characteristics of the device. This data may be used, for example, in the GxDB so that power may be estimated without having to collect historical utilization data.

According to some embodiments, Calculated Reliability Data may simply be the ongoing calculated reliability of a system based on the environment. It may be called out separately from the more generic Analyzed Data to emphasize its difference with Reliability Profile Data.

Dependency Data may be meta-data that may describe what the dependencies are between assets. For example, a process depends on a server and a storage array and a set of physical drives contained within the storage array. This data may be used, for example, to analyze end-to-end reliability of a service.

The Persistence Model may abstracts how data is stored from the rest of the system. It may consist of a thin layer that translates between Object Model and Persistence Model for both modifications and queries. This layer may also contain logic for maintenance and administration of the database used in a data center power analysis product.

The schema for the persistence layer may be a normalized representation of the Object Model. The schema may also be laid out in such a way as to maximize efficient retrieval and storage of data.

The Data Access Layer may be the set of objects that abstract away the detail around database queries, transactions, and table manipulation.

The Database Administration Manager may be a subsystem that manages the database. It may manage database creation including implementation of the schema, database destruction, database backup/restore, schema upgrade, table maintenance, and space management.

The Management Layer Model may abstract the management level view of the object model from the rest of the system. It may consist of a thin layer that translates to and from the Object Model view.

The Analytics Engine may be the domain that handles reporting, analysis, optimization, and control features in data center power analysis software. It may be structured in such a way as to maximize reuse of code across multiple features, to provide natural abstractions for independent development, and to provide maximum flexibility for the set of features to be altered even dynamically where necessary. It may be a multi-tasking state machine that may scale to handle many tasks simultaneously whether those tasks are for the same feature or different features.

The Analytics Engine may scale to handle hundreds of tasks simultaneously across a very large quantity of data. These tasks may vary from user-initiated tasks requiring real time status and return data to system internal tasks requiring no return data and log based status.

The feature set from a system perspective may be disparate in terms of resulting data and the way it is presented, although much of the same data may be used to calculate and manufacture intermediate results. However, how these calculations are achieved may vary greatly. The Analytics Engine may support features that range from partially hosted distributed services to I/O intensive local services. It also may handle features that can take a significant amount of time to run as well as features that require immediate results.

The Analytics Engine performs tasks that are completely abstracted from each other. As a result, a set of entities may exist to limit these independent tasks from exhausting resources. Resource pools are used to accomplish this where possible (e.g. thread pools, memory pools, etc). Features built within the Analytics Engine may also take into consideration resource utilization of the systems they are monitoring.

Figure 8:
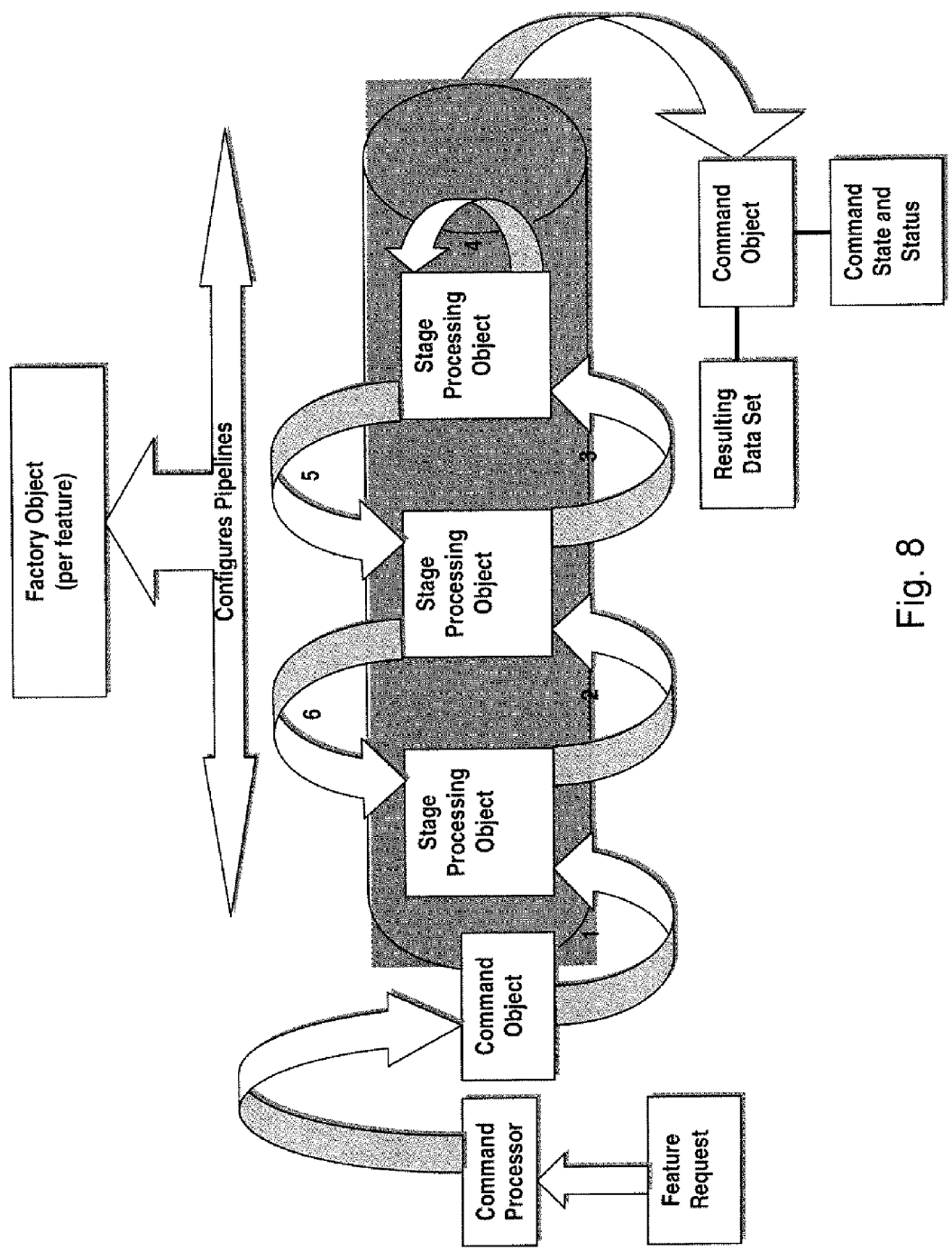
FIG. 8 depicts a pipeline design for command execution in a power analysis system in accordance with an embodiment of the present disclosure.

The object-oriented framework for the Analytics Engine may be built on a pipe and filter type of design where small focused independent modules of functionality, known as filter objects (also called pipeline stages), may exist together ordered in a pipeline. Commands may be run through the pipeline in one direction giving each stage object the opportunity to collect or process data along the way. When the end of the pipeline may be reached the command may be run through the pipeline in the opposite direction giving each stage object the opportunity to once again collect or process data. FIG. 8 outlines the pipeline design that is explained in the sections that follow.

Factory objects may be per feature objects responsible for creating and destroying pipelines. They may receive creation events that specify setup parameters for the pipeline itself such as resource constraints and parameters for stages. In most cases these pipelines may be set up at startup time and may be static in nature, but there may be nothing to prevent them from being short lived dynamic entities that come and go as needed.

Stage objects may be the logic blocks that may define how a feature works. They may be simple focused independent modules of functionality that together may create complex features. The stage objects may each receive commands and either performs calculations on the data attached to the commands or retrieve additional data required for further processing. Stage objects may also choose not to process certain types of commands in which case the command passes through unmolested. Stage objects may be stateless with regard to individual commands. They may simply act on commands that carry state information with them through the pipeline, however they may track state of the pipeline or parts of the system not related to any single command instance.

Command objects may be run through the pipeline and may not passed through the stage objects. Command objects may contain the parameters for the command, the calculated and/or retrieved data, the current state of the command, and the resulting status.

The command processor may be a singleton object that may create, destroy and direct commands through the pipeline via a well-known interface that all stage objects implement. It may be also the entity that contains the thread context in which commands run through the pipeline. There may be a thread per command that carries the command through the pipeline. The command processor may receive requests from the management interface layer and convert those requests to pipeline commands. When completed the command data and status may be transferred back to the management layer.

In addition to individual pipelines per feature there exists two other pipelines. One called the Global Pipeline may be a single instance across the entire system. The stages contained in the global pipeline apply to the entire suite of features. For example, it could contain a stage that allocates memory for data to be returned in certain instances or it may be a licensing stage that decides a license limit has been exceeded and to not allow the command to continue to the other pipelines. According to some embodiments, all commands may be run through the Global Pipeline before other pipelines.

The other pipeline may be called the Run-First Pipeline. There may be an instance of this type of pipeline per regular pipeline instance, however it may contain common stages that may only apply to the individual pipeline instance in question. For example, a health stage may exist on this pipeline that may prevent commands from running down the feature pipeline due to an error condition. All commands run through the appropriate instance of the Run-First Pipeline after running through the Global Pipeline, but before running through the respective instance of the feature pipeline.

There may be a number of general feature patterns that may be supported by the analytics engine. There may be internal system maintenance features such as data rollup and database table maintenance. There may be hosted services such as GxDB and CFD analysis that may be communicated with via the analytics engine. There may be reporting services such as zombie server finder and power utilization reports. There may also be control features such as lights out handling and power capping. All of these types of services may be built within the framework outlined above.

Errors may be handled in a number of ways in the analytics engine. Commands may carry error state with them and each stage may decide what it should do based on the error. When critical errors occur and it may be determined that the command cannot continue the stage device may return a status turning the command around as if the end of the pipeline has been reached. In this case the command processor may simply simulate the end of pipeline condition.

There may be features that require significant processing and therefore significant amounts of time to complete a command. A status subsystem may exist outside of the analytics engine framework, however this subsystem may query status within the framework through a request to the command processor. The command processor knows where in the pipeline a command may be at any given time and may calculate percentage completion in terms of stages. The command itself may be queried as to how far through the individual stage process it may be currently in.

License enforcement may be achieved through the pipelines themselves. There may exist a license stage on both the Global Pipeline and on each Run First Pipeline. These stages turn commands around with error status when a license limit has been reached.

Figure 9:
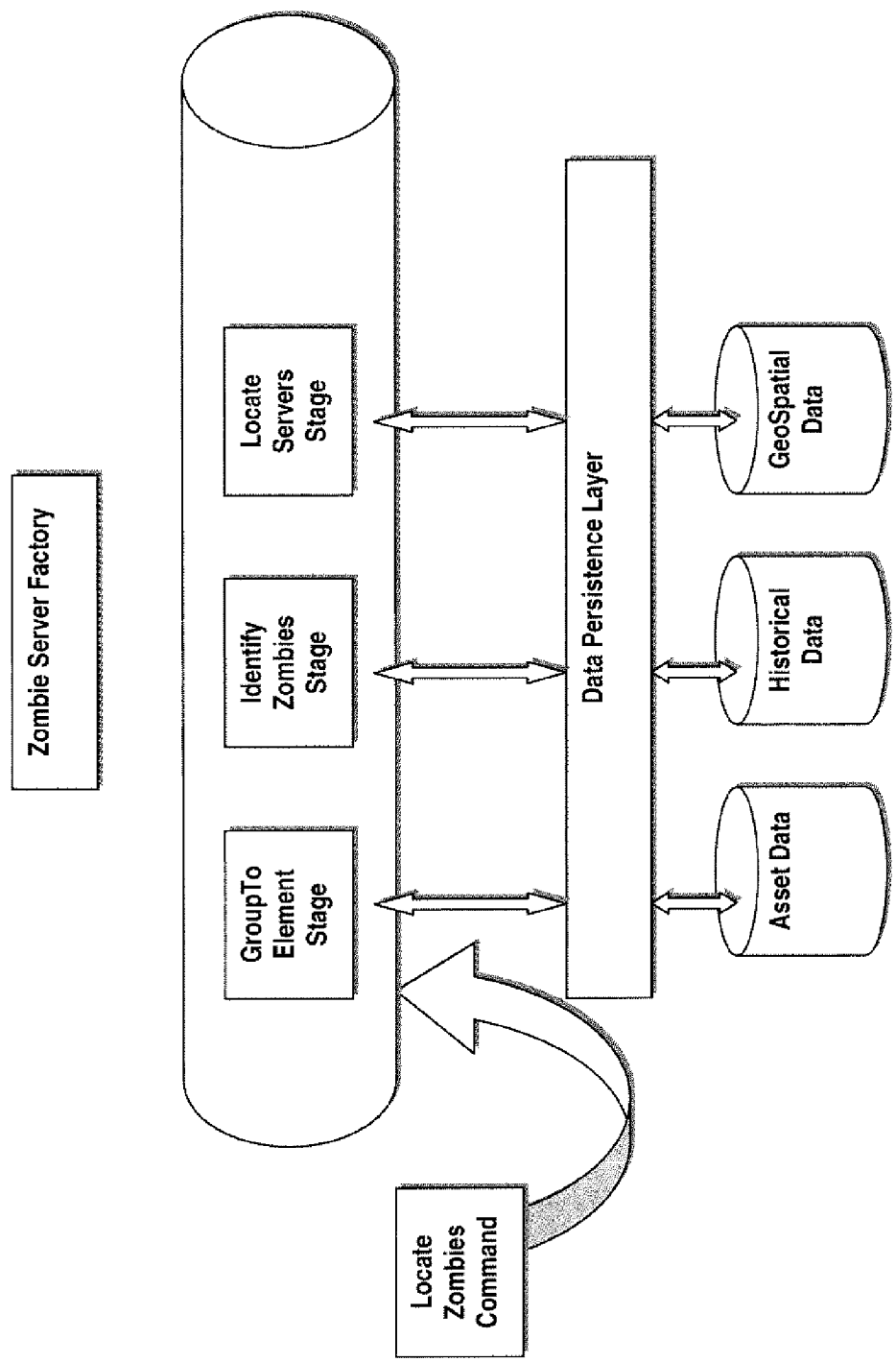
FIG. 9 is a dataflow diagram depicting identification of zombie servers (i.e., unutilized servers) in a data center in accordance with an embodiment of the present disclosure.

Since frameworks as well as architecture, by nature, may be somewhat abstract an example of how a feature might be implemented may be laid out is illustrated in FIG. 9. The feature may be a zombie server locator, which returns the identification and geo-spatial location of zombie servers that belong to a specific group container. Other features may also be implemented using frameworks.

In FIG. 9 there may be three stages. The first may be the GroupToElement stage, which simply figures out given a group container name what servers belong to it. If we are only looking for zombie servers in a group then the stage object may populate the command data with only those servers it retrieves from the asset database belonging to that group. The next stage may be the IdentifyZombies block. This stage simply finds zombie servers based on utilization data for the elements contained in the command. The last stage may be the LocateServers block. This stage simply queries the geo-spatial database to return location information on assets in the command it receives.

All three of these stages may be self contained and abstracted such that one does not know what the one before it had done or what the one after it will do. Each one of these stages may be generic enough where they could easily be used in other features. For example, the LocateServers stage could be used in a server placement type of feature.

The discovery engine may be responsible for cataloging data center assets and associated attributes into persistent storage.

Data center assets not only include typical IT assets like servers, disks, disk arrays, memory, motherboards, expansion cards and switches but also includes facility assets like Computer Room Air Conditioners (CRACS), Power Distribution Units (PDUs), generators, circuits, software assets that represent applications running on the servers and finally structural assets like buildings, walls, floors, racks etc.

Assets may have some common attributes like geo-spatial information that describe where the asset currently resides or may reside. These common attributes may be collected and written to persistent storage and correlated with the asset.

In addition, asset specific attributes may need to be collected, written to persistent storage and correlated with the asset. For example:
- IT asset attributes might include, make/model, serial, amount of memory or storage, etc.;
- Structural asset attributes might have surface type, densities, etc.;
- Facility asset attributes might have make/model and cooling capacity, etc.; and
- Software asset attributes might have vendor and version information, etc.

Multiple simultaneous discovery instances may be supported to accommodate large networks. This might mean a single operator running multiple instances or multiple operators running discovery instances.

The discovery engine may scale from a closet with a single server to the largest of data centers that may contain a million assets. The discovery process and database footprint resulting from the cataloging of assets and attributes may scale accordingly.

With the exception of User Interface (UI) and persistent storage layers, the discovery engine may not know about any other part of the system. There may be a possibility that a 3rd party solution may be leveraged here so knowledge of other components may be minimized.

The actual assets and asset attributes may be unknown and so they may be extensible.

The method and order of discovery of assets and attributes may be flexible. In some cases, one or more portions of asset discovery for a data center might come directly from a spreadsheet. In other cases, parts might be detected from automatic asset discovery and some amount of computer aided data entry. In other cases geo-spatial information might come from a spreadsheet, aided manual input, manual input or might not be gathered at all. Discovery may be made with a minimum impact on a data center.

According to some embodiments, the discovery process may be initiated infrequently. As such the discovery process may not be real-time, but may be as efficient as possible.

A user may be able to discover data center assets and attributes (including geo-spatial attributes such as the location of assets) to at least a pod level within a few minutes to an hour of using the tool as opposed to the weeks of time it currently takes with conventional methods.

The discovery engine may be invoked by the data center operator to initially discover assets or perhaps as a periodic scheduled task. The discovery process may be directed at one server, a particular subnet or IP range, or the entire data center.

The discovery engine may leverage existing technology where it's available to automatically discover assets and attributes. This may or may not include use of SNMP, WMI, IPMI, SSH, BACNet, ModBus, or even proprietary protocols. A single discovery might require several protocols to complete the process. Furthermore, in some cases, the discovery may first discover an asset at a high level before gathering more detail for the asset. Several discovery passes may be made to fully capture an asset.

Assets and attributes may be discovered and written to persistent storage without direct knowledge of protocols used to obtain the data. In addition, the discovery engine may have no direct knowledge of the persistent storage layer details.

The discovery engine may not rely on any protocols directly. In this context, manual entry of data or import of data from files may be just another "protocol". Instead abstractions that sit over protocols may be used. This way additional protocols or even custom methods of collecting and writing data may be added.

Not all protocols are equally capable. As such each protocol may define what capabilities it supports.

Design may assume that multiple protocols and multiple passes might be used to complete a single discovery.

The data returned from protocols may or may not match the internal object model representation. As such the collected data may be translated. This translation may be externalized such that new devices can be supported without requiring the core code to be recompiled.

The in memory object model objects may be written/read to/from persistent storage. Details of this process may be abstracted. The actual backing store might be a local/hosted database at a service center or local/hosted database at a data center, a flat file, debug log etc. The data persistence abstraction layer may be responsible for translating in memory objects into data persistence objects which get written out to backing store and for translating backing store objects to in memory representation during a read operation.

Requests to persistent storage layer may be aggregated together to minimize the amount of backing store access. If deemed necessary a write thru or write back cache of most recently used in memory objects might alleviate need of repeated access.

A Configuration Management Database (CMDB) import request might simply be a discovery launch where the implementation below the protocol abstraction may be the specific kind of "CMDB import" protocol.

Database storage for assets and associated attributes may be a service resource or a data center resource. As such, the design should not preclude discovery engine running remotely from location of backing storage. In addition, it's conceivable that the discovery process itself may be entirely or have parts that are remote from the data center being discovered. However, data may be analyzed centrally.

There are two aspects to error handling, detection and recovery. If a particular discovery instance "rediscovers" an asset and detects a conflict it may reconcile against what may be already cataloged. For example, it may find that the server at a given IP address has been replaced with another server or that it was upgraded with more memory or received a new expansion card.

If the discovery process detects an asset, but times out during detailed or deep discovery, the discovery engine may make note and move on.

If errors occur during an interview or computer aided interaction with data center operator, the discovery engine may provide suggestions on recovery methods. Errors may be noted and presented at the end of discovery to reduce impedance of the discovery process. For example, its not likely the operator may be standing in front of the console during a long import or auto discovery.

During discovery the engine may provide progress information (e.g., a visible incrementing count of the number and kind of assets discovered, lost connection counts etc.) If there are multiple phases to the discovery, the engine may report what phase may be currently active. If there are multiple discovery instances each instance may report independently and also provide an aggregated view.

When discovery is complete, status may indicate completion and provide suggestions on how to handle any error cases.

The discovery engine may send up status information through a user interface layer from a UI polling status command.

The data collection engine may be an asset monitor. The job of the data collection engine may be to collect vitals on assets and to archive that information into persistent storage. The type of information collected may vary by type of asset and may be driven by analytics engine requirements. The previously discovered data center assets (IT, facility, and software) may be polled and the collected data along with a time stamp(s) may be written into historical persistent storage.

| Examples of Data to be collected | Probable/Possible Source |
|---|---|
| CPU Performance data | SNMP |
| Memory Usage | SNMP |
| Storage Usage and Performance | SNMP, SMI-s, API |
| Temperature sensors | SNMP, API |
| Process Table Performance | SNMP, SSH |
| PDU Power Usage | SNMP, API |
| UPS Status Information | SNMP, API |
| CRAC Unit Status Information | SNMP, API |
| Power Conditioning Status Information | SNMP, API |
| Switch Configuration and Status Information | SNMP, SMI-S, API |
| Chiller Status Information | SNMP, API |

The polling frequency can be user specified with a reasonable default.

Multiple simultaneous instances of data collection may be supported to accommodate large networks. This might mean a single operator running multiple instances or multiple operators running data collection instances.

According to some embodiments. the system may be able to poll a million assets in 5 minutes without negatively impacting performance of data center services.

The historical data may be written continuously to persistent storage. As such, the footprint of the historical data may scale up to a million polled assets every 5 minutes for some amount of configured time. A separately scheduled "rollup" analysis task may aggregate statistics by averaging data to avoid data over run. However, the amount of storage between rollups may scale accordingly.

The actual data collected may be unknown and so it may be configured to be extensible.

The method and order of collection may be flexible. In some cases, data might come directly from a spreadsheet. In other cases, parts might be collected from automatic polling and some amount of computer aided data entry. Collection may be designed to minimize impact on a data center.

Data collection may be a continuous polling process and as may be very efficient. The system may be able to poll a million assets in 5 minutes without negatively impacting data center services (servers, network, etc).

The data collection engine may use previously discovered assets to figure out what to poll, collects vitals from those assets and write asset correlated vitals to historical persistent storage with timestamp(s).

If the monitor fails to find a server that was previously discovered, a user may be alerted. Conflicts may be noted and addressed at an end of a data collection process.

A separately scheduled "rollup" analysis task may aggregate statistics by averaging data to avoid data over run. The monitor task may record vitals but may not perform data aggregation.

Asset vitals may be collected and archived into persistent storage without direct knowledge of protocols used to obtain the data. In addition, the data collection engine may have no direct knowledge of the persistent storage layer details.

The data collection engine may not rely on any protocols directly. In this context, manual entry of historical data or import of data from files may be just another "protocol". Abstractions that sit over protocols may be used. This way additional protocols or even custom methods of collecting and writing data can be added.

Not all protocols are equally capable. As such each protocol may define what capabilities it supports.

The data returned from protocols may or may not match the internal object model representation. As such the collected data may be translated. This translation may be externalized such that new devices can be supported without requiring the core code to be recompiled.

The in memory object model objects may be written/read to/from persistent storage. Details of this process may be abstracted. The actual backing store might be a local/hosted service center database or local/hosted customer database, a flat file, debug log etc. The data persistence abstraction layer may be responsible for translating in memory objects into data persistence objects which get written out to backing store and for translating backing store objects to in memory representation during a read operation.

Requests to persistent storage layer may be aggregated together when possible to minimize the amount of backing store access. If deemed necessary a write thru or write back cache of most recently used in memory objects might alleviate need of repeated access.

Data collection for some assets might be manually imported from spreadsheets or some custom format. For example, it's possible that some third party tool may collect certain data at some frequency on certain assets and may generate a historical report in some specific format. The collection engine may be abstract enough to support this custom source of historical data.

A collection engine may run remotely from location of backing storage. The collection process itself may be entirely or have parts that are remote from the data center being monitored. However, data may be centrally analyzed.

There are two aspects to error handling, detection and recovery. If errors occur during an interview or computer aided interaction with data center operator, the data collection engine may provide suggestions on recovery methods. Errors may be noted and presented at the end to allow collection of data to complete. For example, its not likely the operator is standing in front of the console during a long import or collection.

There may be a graceful way of handling data over run. The collection engine may not assume that the user has configured and provisioned rollup correctly.

During data collection the engine may provide progress information (e.g., a visible incrementing count of the number and kind of assets polled, lost connection counts etc.). If there are multiple phases to data collection, the engine may report what phase is currently active. If there are multiple data collection instances each instance may report independently and may also provide an aggregated view.

When data collection is complete, a status may indicate completion and provide suggestions on how to handle error cases.

The data collection engine may send up status through a UI layer (e.g., from a UI polling status command).

The Data Center Genome Map (GxDB) may be a web-hosted database that may contain detailed characterizations of common data center equipment including, but not limited to, server, arrays, CRACs, power management systems and physical infrastructure. The general approach may be to describe systems (such as servers or storage arrays) as aggregations of their constituent components: CPUs, memory, disks etc. For each component, data may be collected and maintained around power consumption, reliability, functionality, performance and interfaces as well as size and weight where appropriate. The information in the database may be used to perform software based power measurement, reliability analysis, and logical/physical simulations.

Figure 10:
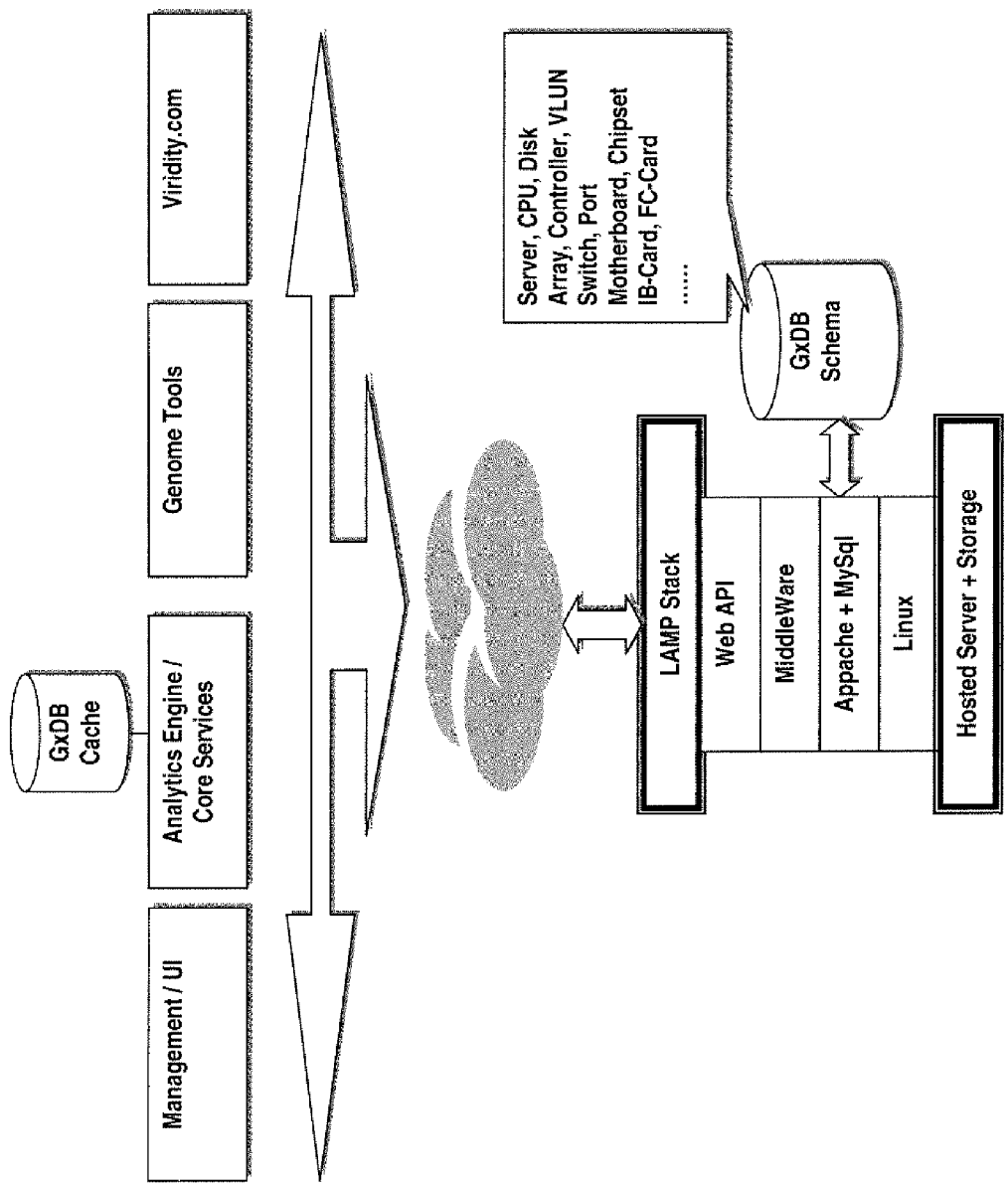
FIG. 10 depicts a system for analyzing power at a data center in accordance with an embodiment of the present disclosure.

Illustrated in FIG. 10 are the major components that make up the hosting services for a configuration or profile database (e.g., GxDB) as well as several clients of the service, according to one or more embodiments.

The GxDB may be capable of maintaining detailed characterizations of equipment and components found in customers' data centers. Over time this collection may grow to include all IT equipment commonly available. The database may contain on the order of tens of thousands component descriptions.

The content and form of the database may evolve over time. The schema may be sufficiently general and extensible to allow for easy addition of new information about various component types as they are discovered during testing.

The component or profile database (e.g., the GxDB) may have a very low rate of information growth; only a relatively small number of records may be added per day somewhere in the tens or hundreds range may be likely. The database may be able to service on the order of tens of complex queries per second. According to some embodiments, the GxDB may be generally a write-once-read-many repository and multiple replicas of the system may easily be created.

According to some embodiments, the GxDB may be implemented with standard open source databases and web hosting tools. In other embodiments, a custom database system or a larger commercial system for the underlying SQL engine or web middleware may be used.

The GxDB schema may be derived from the Data Center Object Model described above. Tables may be organized around data center component types (e.g. CPU table, disk table, motherboard table etc.). The data center components within tables may have unique keys that may be used to identify specific components that make up larger systems such as servers and storage arrays.

For a given data center component the schema differentiates the source and quality of the information about that component:

According to some embodiments, there may be three levels of information:
  i. Specification Sheet(s)—data from manufacturers' specifications;
  ii. User Contributed—data contributed by a user community; and
  iii. Service provider Verified—power and reliability data collected with supplied tools.

According to some embodiments, the GxDB may be hosted on the web. A hosting service may use a Linux server platform, storage, maintenance and backup/recovery operations required for any web-hosted application. GxDB may use a dedicated server (physical or virtual) with ssh access, and the ability to install arbitrary packages. Bandwidth may be not a primary concern.

There may be two types of interfaces to the GxDB:
  Asynchronous Web GUI for end user access
  APIs for programmatic access from other Components
Either or both of these interfaces may support: Lookups/Queries, Inserting new data, Access to logs, Maintenance, Table space, Backup, Recovery, and Genome Utilities.

In order to facilitate population of the GxDB, there may be a set of tools to help characterize IT equipment in the field. These tools include but are not limited to: CPU load generator, I/O load generator (storage and data networks), Discovery tools to read configuration information, Automated power readings from PDUs or USB based power meters, and Utilities to insert collected data into the central GxDB.

According to some embodiments, no customer proprietary information may be transmitted to, or stored in the GxDB. Best practices for securing the hosted data may be implemented. Both the API and User interfaces may require user authentication. The origin of any user-contributed information may be tracked.

The information in the GxDB may be central to the operation of the software components deployed in customer data centers. For performance and network access/security reasons, subsets of the GxDB may be cached or replicated on to the software deployed at customer locations.

As a centrally hosted service that may be continuously in use by one or more customers, the GxDB may detect and automatically recover from a wide variety of system failures. The database itself may be deployed in a redundant fashion, it also may implement monitoring to detect functional and performance problems and may "phone home" and/or alert when potential failures are detected.

The user interfaces for the product may support a wide range of features, from basic configurations of the software components to state of the art 3D modeling and simulation of large complex data centers. There may be a number of discrete interfaces to support specific user stories.

The user interface architecture may provide a caching mechanism to efficiently maintain current working sets of information. Display components may have the ability to page in subsets of IT components and results sets. Multiple users may interact with a power analysis system simultaneously.

The GUI architecture may support simple data collections utilities, system configuration wizards, CAD style layout tools, and advanced data visualizations. The general high-level of the GUI may be illustrated in FIG. 11.

Figure 11:
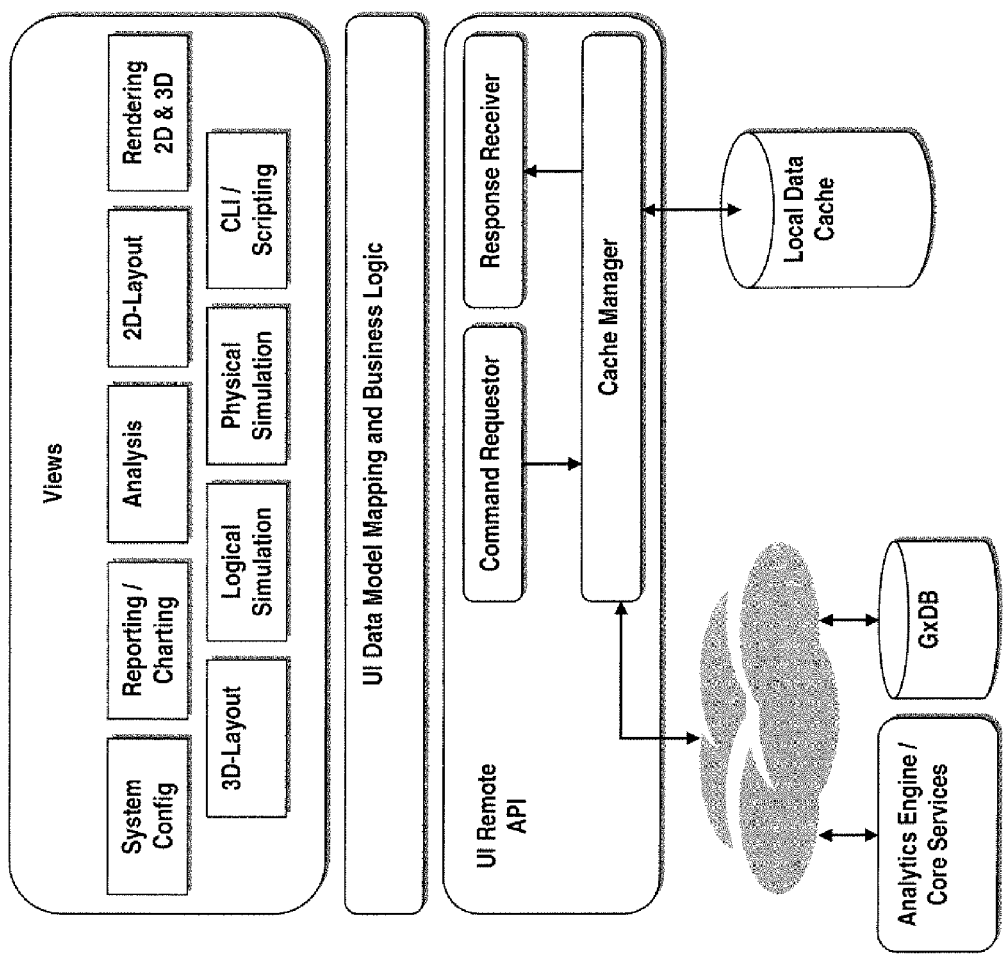
FIG. 11 depicts a software architecture for analyzing power at a data center in accordance with an embodiment of the present disclosure.

FIG. 11 depicts a plurality of exemplary views.

The Data Model layer may provide translation from a core component view of the OM to a model that may be organized for efficient GUI operations. In many cases this may be a trivial pass-through, however the architecture may allow clean separation of views from the processing elements in the system. This layer may also implement business logic that may be common across views, but not appropriately implemented in the analytics, discovery or monitoring systems.

The user interfaces may be multi-threaded on two levels. The GUI windowing system may be event driven and multi-threaded to ensure responsive, non-blocking widgets, and the remote API may be built around an asynchronous command/response mechanism that can handle multiple outstanding requests.

The remote API layer may facilitate communication between the GUI, the GxDB, and the core software. This layer may implement an asynchronous command/response mechanism and some form of result caching.

Role based security may be used to control access to data collection and system control features. The software may also support wire encryption for data centers that are remotely monitored and managed over public networks.

Data center power analysis products may include a hosted GxDB web server, customer installed soft appliances, and the web deployment server(s) from which users and/or customers may download patches for their soft appliance(s).

The Property Manager may be a singleton that may be used commonly across one or more components in the system.

This subsystem may allow each product to have a set of default values that may be modified, even at runtime, to avoid the need to rebuild, re-deploy, and in some cases, restart our product services to change behavior.

A UI to view and modify the current property values may be available via a command line interface for internal or field support personnel use only.

A few examples of some properties may include:
Global or component level debug enable/disable Boolean;
Boundary Limits;
Timeout settings; and
Logging.

The Logging Manager may be a singleton that may be used commonly across one or more components in a system. It may be an example of a subsystem that may leverage the Property Manager to enable/disable various logging settings.

Each component may have a separate log file that provides clear and concise errors, warnings, and informational messaging. Such messaging provides sufficient information to monitor our products' runtime status. Log files may be created when our services start and are appended until the service may be stopped. Previous log files may be rotated (up to a limit; e.g. 10) for historical review.

According to some embodiments, the Logging Manager may be employed by one or more components and sub-systems to provide uniformity amongst various components with respect to output style; i.e. the date/time format and in the case of Errors and Warnings, the message may be prepended with "Error:" and "Warning:" respectively.

Logging levels may be increased to aid in debugging by development, QA and field support. Such logging levels will be considered debug level output, enabled by properties managed by the Property Manager.

There may be a global debug option enabling all debug messaging as well as more granular logging for specific components or sub-systems. Such debug output may be prepended with its specific debug tag for ease of searching through the log files; e.g. Discovery Debug.

A sample of the types of debug categories may include: Discovery, Data Collection, Analytics, Security, Job Scheduling, Persistence/DB Access, Configuration, Job Scheduling, UI, and Others, as needed.

An Auditing Manager may be a singleton that may be used commonly across one or more components in a data center power analysis system to manage one or more portions of security auditing related information.

An audit log on each VSS cites the security related information that identifies the date/time, user, and request initiated in our system along with any security related alerts or errors. For web server access, the IP address of the requesting client will be noted as well.

All VSS components may offer trace facilities that may be disabled by default, but may be dynamically enabled as needed via the Property Manager. Trace level information may include date/time, Class Name, method name, entry/exit indicators, and method parameters.

The debug CLI may be a debugging utility that can access a live system. It enables the user to display and modify object information, including object attribute values, and stack information.

Although the soft appliance may be a white box installed with a Linux distribution that post-installs a data center power analysis product, a user may consider it to be a black box (i.e. not to be shared with other products and/or services), thus ensuring appropriate system resources are available.

Upgrades are posted on a Viridity web server and available to The Job Scheduler may be a singleton that may be used commonly across one or more components in a data center power analysis system. It supports the scheduling and execution of tasks at a specified time by either a user or by a component in our system.

The major internal components of the soft appliance or users may rely on a job scheduler for time-intensive tasks on which we do not block, e.g. a large data center mapping discovery session or a long-running analytics run. Further, customers may rely on the job scheduler for database cleanup of aged-out data at pre-assigned intervals or for managing configuration backup for disaster recovery purposes.

The Job Scheduler may accept input to address the following questions:
What job is to be executed?
Who scheduled the job?
When the job was scheduled?
For when the job is scheduled to execute?
Is the job recurring and, if so, at what intervals?

The Status Manager may be a singleton that may be used commonly across one or more components in a data center analysis platform. It may provide status information allowing users to understand current runtime state, including in-progress jobs and jobs scheduled for future execution.

This subsystem may provide the insights into what is going on and how it is progressing. Since job scheduling ultimately requires visibility to a job's status, the outcome of the Job Scheduler may be an integral part of role of the Status Manager, displaying a task's current state (e.g., Scheduled, In-Progress, Complete) and, if In-Progress, its percentage completed. The completion status for any task (e.g., Successful, Failed, Timed Out, etc) may be available as well.

The Status Manager may track jobs with attributes that may include:
What job was scheduled.
Who requested the job.
When the request to execute the job was initiated.
For when is/was the job scheduled to begin execution.
Job state (e.g., Scheduled, In-Progress, Complete).
Job status (e.g., % complete).
Job return code (e.g., Succeeded, Failed, Timed Out, etc.)

Figure 26:
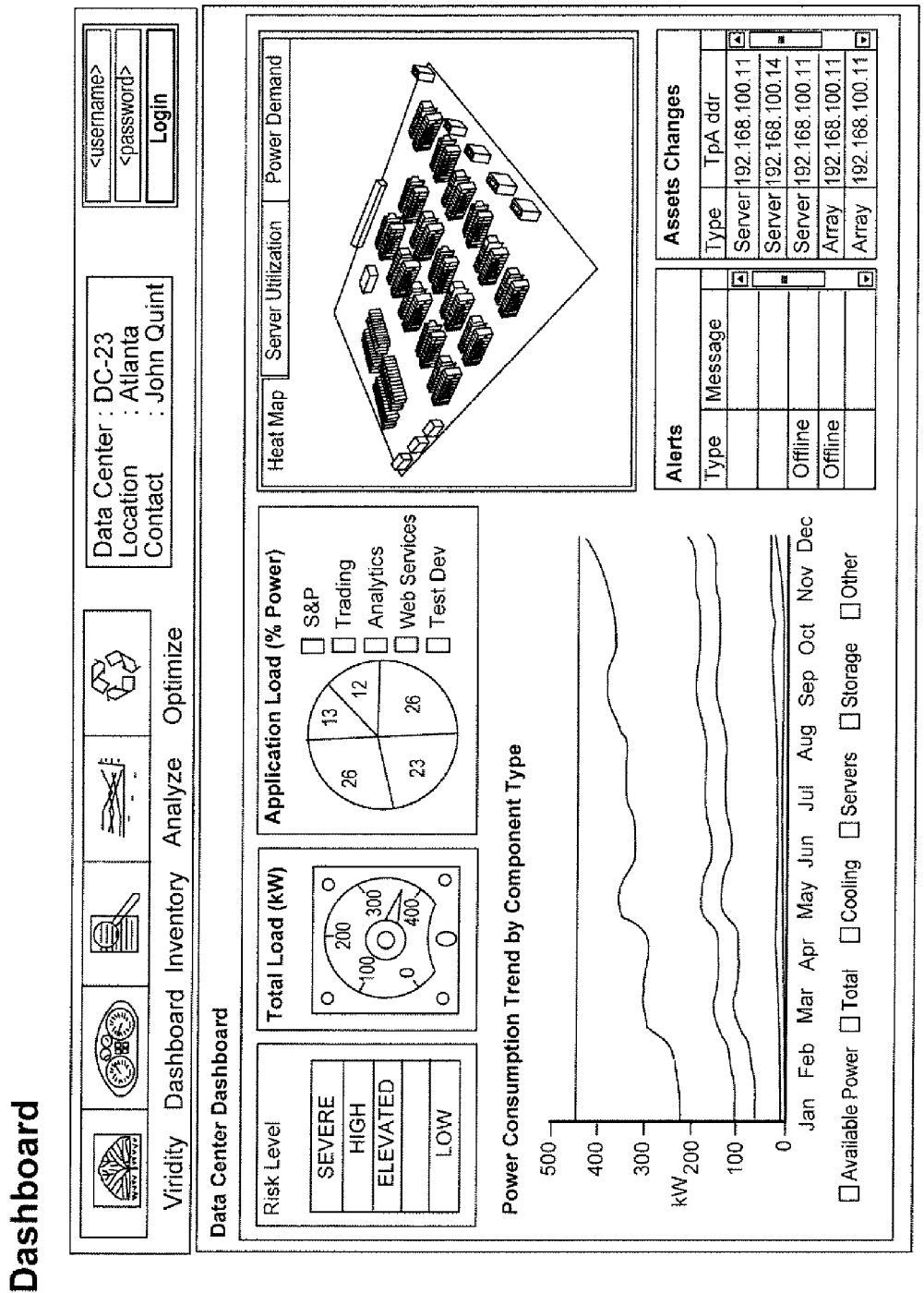
FIG. 26 depicts an exemplary user interface for data center power analysis in accordance with an embodiment of the present disclosure
Figure 27:
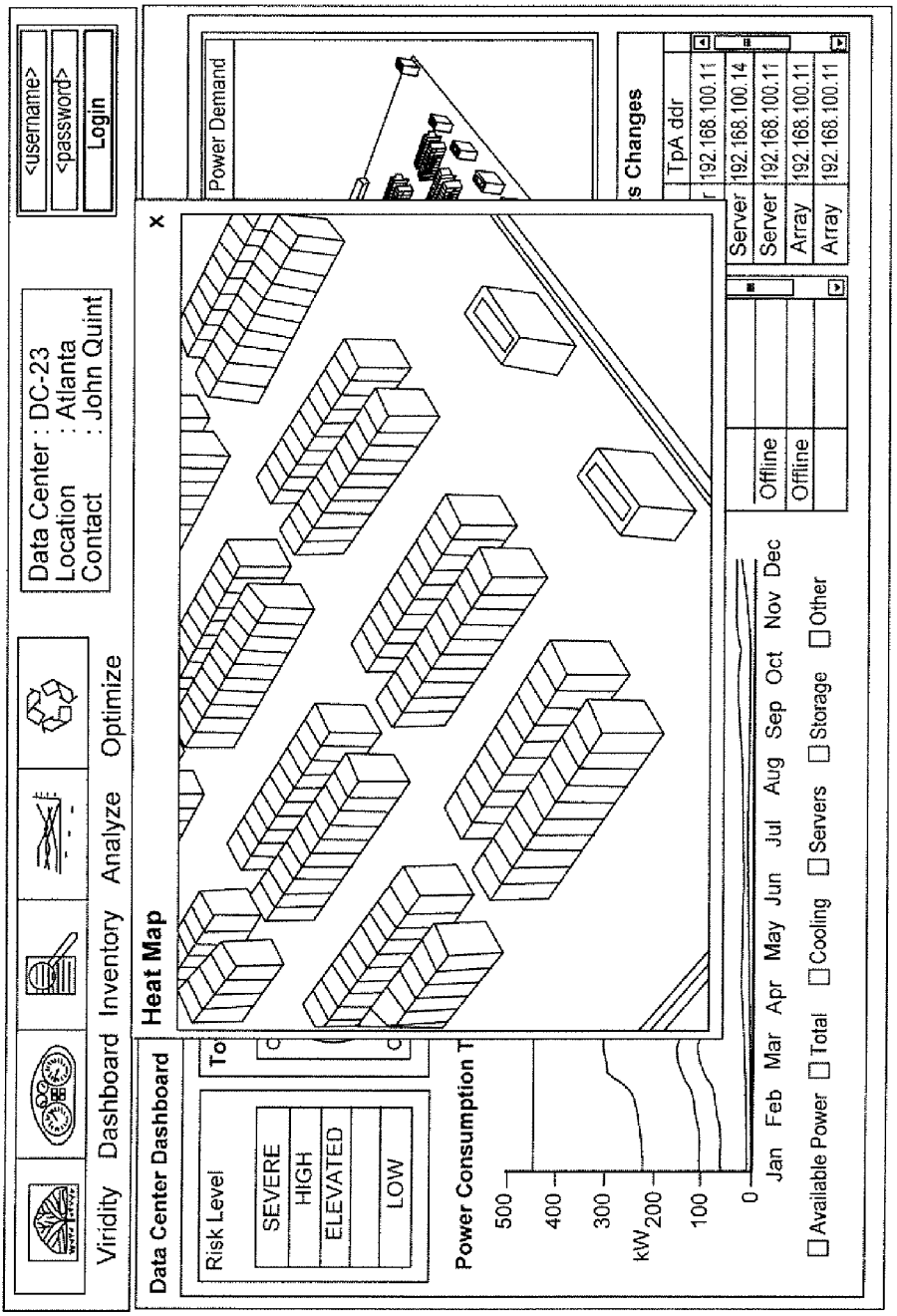
FIG. 27 depicts exemplary user interface for data center power analysis in accordance with an embodiment of the present disclosure
Figure 28:
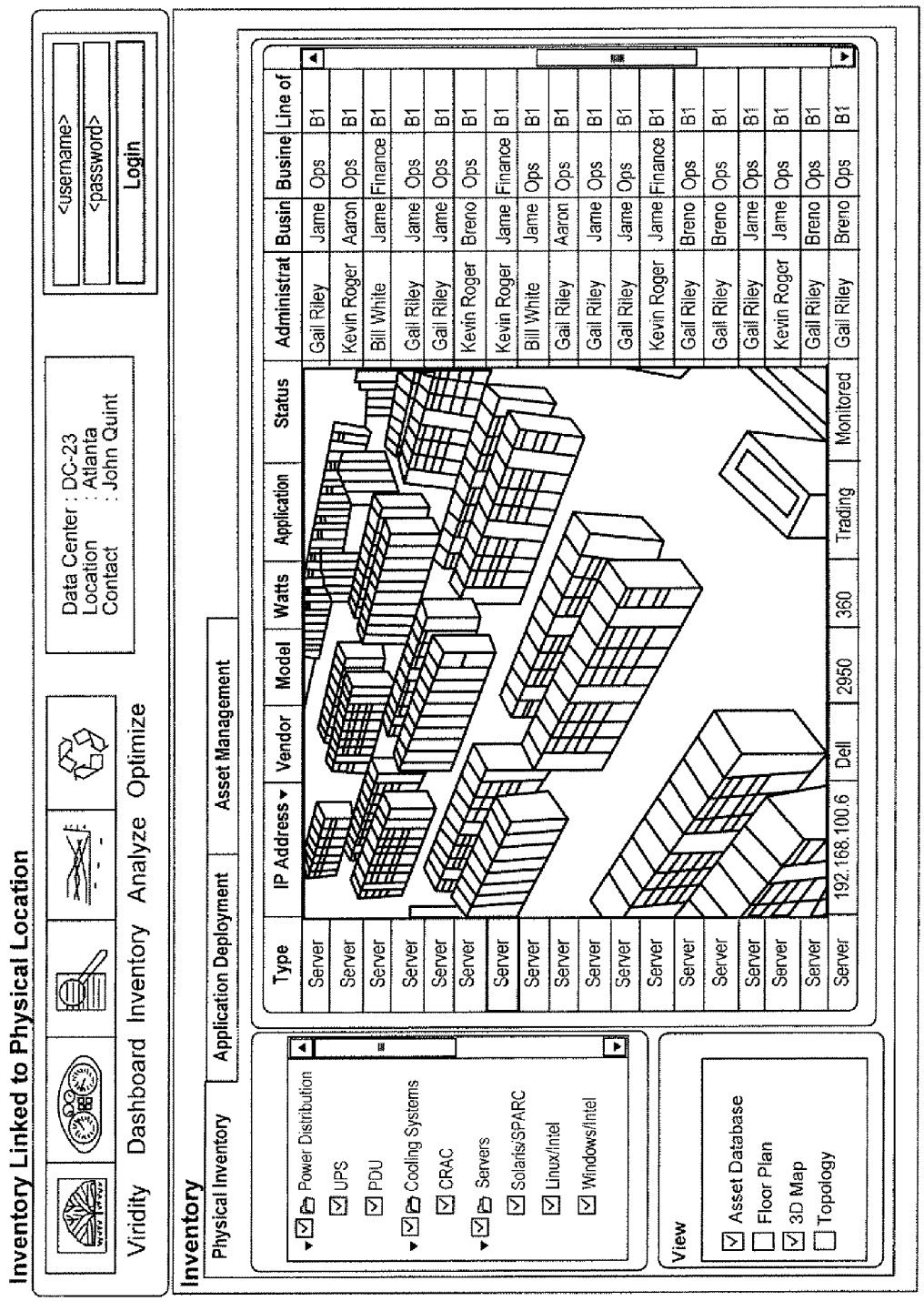
FIG. 28 depicts exemplary user interface for data center power analysis in accordance with an embodiment of the present disclosure
Figure 29:
FIG. 29 depicts exemplary user interface for data center power analysis in accordance with an embodiment of the present disclosure

The User Interface (UI) may offer a dashboard (e.g., FIG. 26), providing visibility into the current state of major components such as, for example, scheduled tasks, running tasks, and completed tasks. Task information may be persisted for a configurable period of time, after which, the history may be subject to removal.

A set of libraries for commonly used functions may offer consistency amongst component implementations and maximizes code-reuse and ease of maintenance.

The libraries may include, but is not limited to, thread pool and memory management tools, locking related functions for semaphores and mutex locks, as well as convenience functions for string manipulation and the like.

The sources for the development class libraries may be stored in common source control package and may not be associated to any one specific component.

Furthermore, persisted data, as well as configuration and database data, may be stored in the UTF-8 format.

The database or electronic storage containing data center assets and collected data may facilitate the understanding of customer issues. An import/export facility may be available to ease the ability to retrieve specific configurations and import them on other systems. This facility may be employed locally to help automate Quality Assurance (QA) test configuration as well as to allow support personnel the insight into customer site configuration issues.

For customer sites that have external network connectivity to the hosted servers, the remote access facility exists to inform users of the existence of upgrades for their currently installed software.

Security may be a high priority at data centers. That being said, there may not be access to customer systems to assist product usage or debug product issues. A tool to snapshot a service system exists to collect the various product and system log files, including configuration and property information. Customers can upload a compressed collection to our field support site. The state contained within the collection may be sufficient to remotely debug a customer issue.

Achieving data center efficiency may require a different but technically rigorous methodology that automatically identifies inefficiencies and applies specific strategies that are proven to maximize energy savings.

According to some embodiments, the approach can be summarized in the following steps:
  i. Understand the existing Physical infrastructure:
      capture the Physical Structure of the Data Center;
  ii. Monitor the Operations (instrumentation and Measurements to identify the current Operations efficiency of all energy systems and IT equipment usage on continuous basis); and
  iii. Understand the Logical to Physical infrastructure: map the Physical IT equipment to the Logical business level IT usage.

Based on identified power related inefficiencies, planning strategies may be proposed to address them.

The Logical, Operations, and Planning steps may work in conjunction to created an automated process for optimizing energy consumption in the data center.

Figure 12:
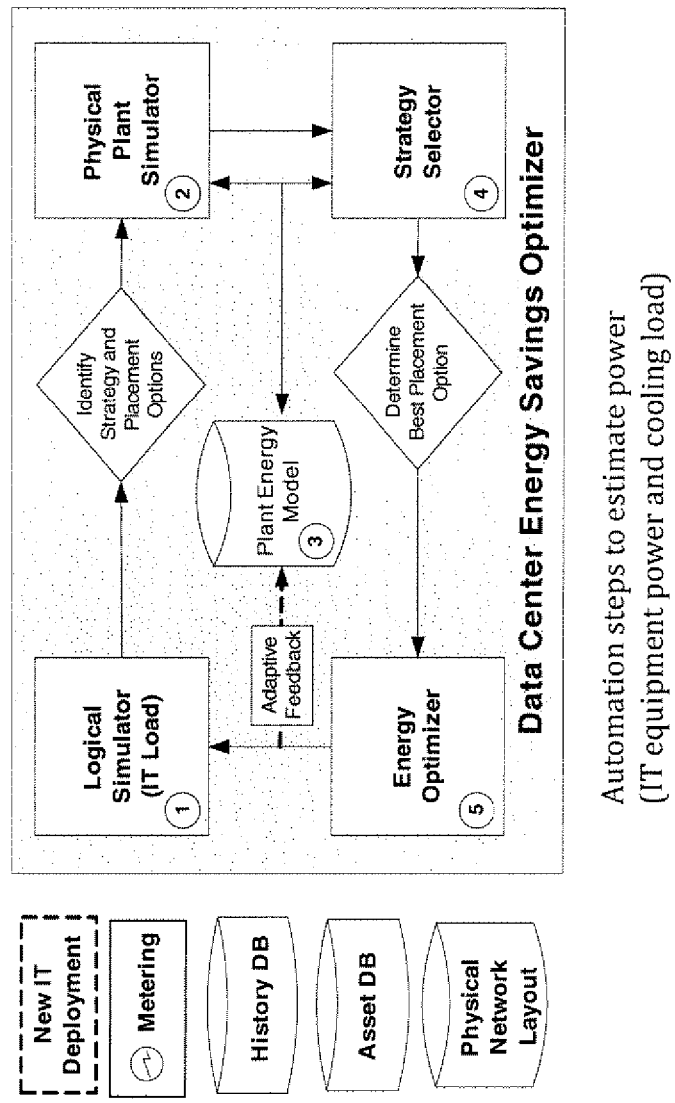
FIG. 12 depicts a system diagram for optimizing data center energy savings in accordance with an embodiment of the present disclosure.

There are five elements in the automation process as shown in the exemplary embodiment of FIG. 12:
1) Logical Simulator (the IT resources' power consumption);
2) Physical Plant Simulator (physical plant thermal profile estimation);
3) Plant Energy Model (data center cooling power estimation model);
4) Strategy Selector (for energy savings); and
5) Energy Optimizer (data center wide).

The logical simulator may work at the logical level to estimate power needed by the IT systems and generates as output a list of viable energy-saving strategies and placement or location candidates that is provided to the Physical Plant Simulator.

The inputs to the Logical Simulator may include:
  i) Physical network and connectivity layout for all IT equipment;
  ii) IT Asset database that maintains all IT equipment deployed;
  iii) History database of IT equipment utilization, efficiency, power consumption, etc.;
  iv) Metering—all sensor data on temperature, airflow or related data from other in-device measurement from any IT equipment; and
  v) New (or any changes in) IT equipment deployment: proposed IT new deployment or redeployment or retirement, or possible relocation, etc.

The logical simulator may use constraint based optimization to generate its recommendations.

Figure 13:
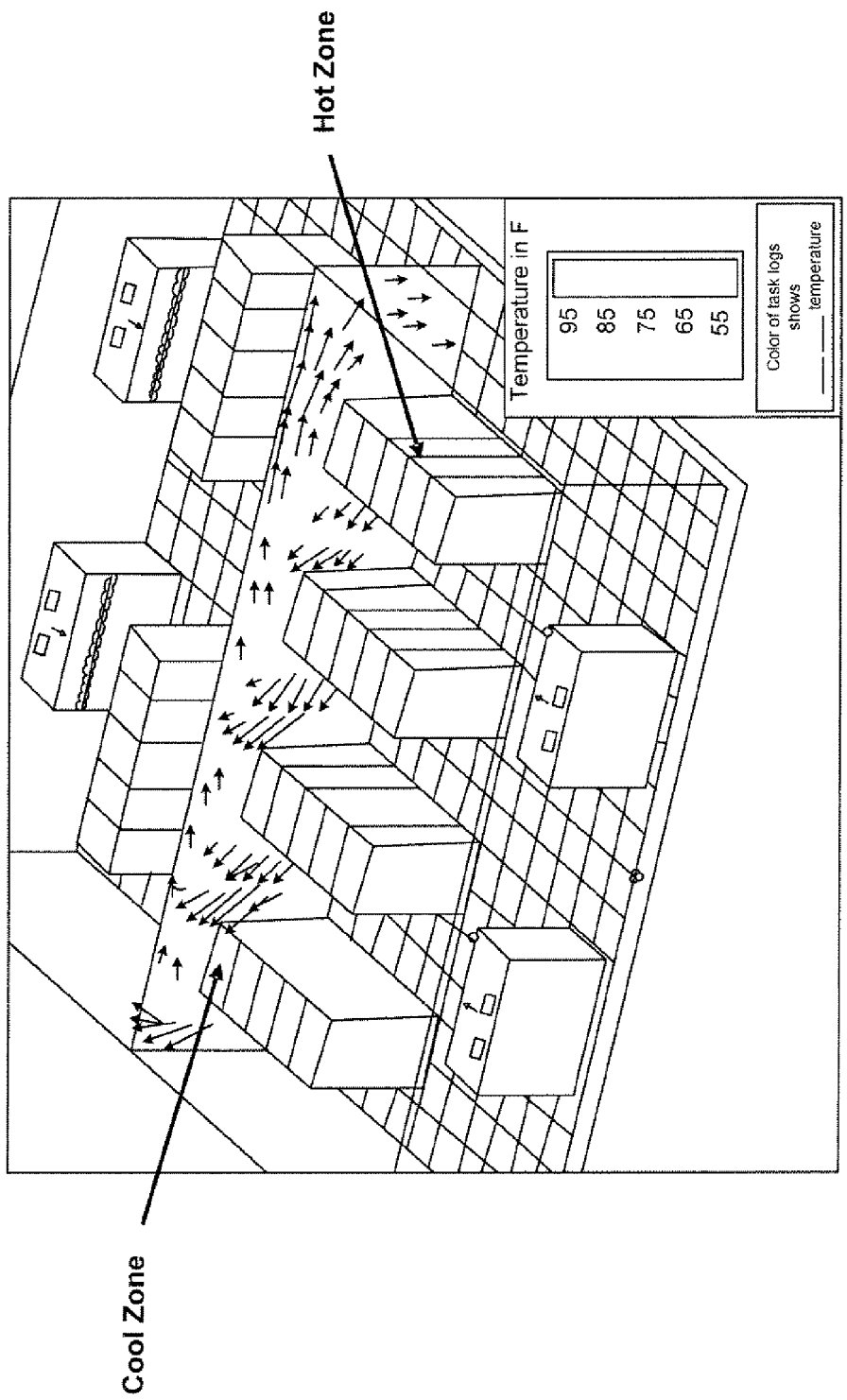
FIG. 13 depicts a thermal flow diagram of a data center in accordance with an embodiment of the present disclosure.

The physical plant simulator may be used to take the output of the logical simulator and translate IT power consumption into the physical plant's thermal profile such as, for example, projecting a 30 thermal map. A thermal map across the different zones of the data center (as shown in FIG. 13) may be derived using computational fluid dynamics (CFD) modeling.

Once the thermal map is obtained, we can estimate the cooling load (e.g., BTUs). This may be performed, according to some embodiments using reference tables, such as those from ASHME, to determine the total cooling energy needed to maintain desired data center operating setpoint temperature.

The model may capture the non-linear model that estimates cooling load required for the plant when a given heat source (i.e., new IT equipment) is deployed in the data center. Since the model may be dependent on the specific physical configuration and IT layout and cooling systems in the data, it may be built through adaptation (feedback) and from any prior knowledge of the thermodynamic properties of the plant.

Based on the cooling load required strategy and placement options provided by the Physical Plant Simulator and the Logical Simulator, this module may determine, using game theory techniques, measurements from the data center and a metric we call the V Index (defined later), the best placement options of the equipment that minimizes the total cooling and power for the data center.

The optimizer may evaluate and analyze the placement options recommended by the Energy Strategy Selector based on the projected total energy (IT power consumption from the Logical Simulator and cooling load from the Physical Plant Simulator) cost. It may determine the optimal strategy and placement option.

When the optimal strategy and placement option is executed, the optimizer may compare the actual cooling and total energy loads and based on errors from projected values, update the Plant Energy model.

Using closed loop control, the data center physical plant model may be continuously updated for accuracy. This in turn may improve the predictability of the overall energy savings for the given data center.

Figure 14:
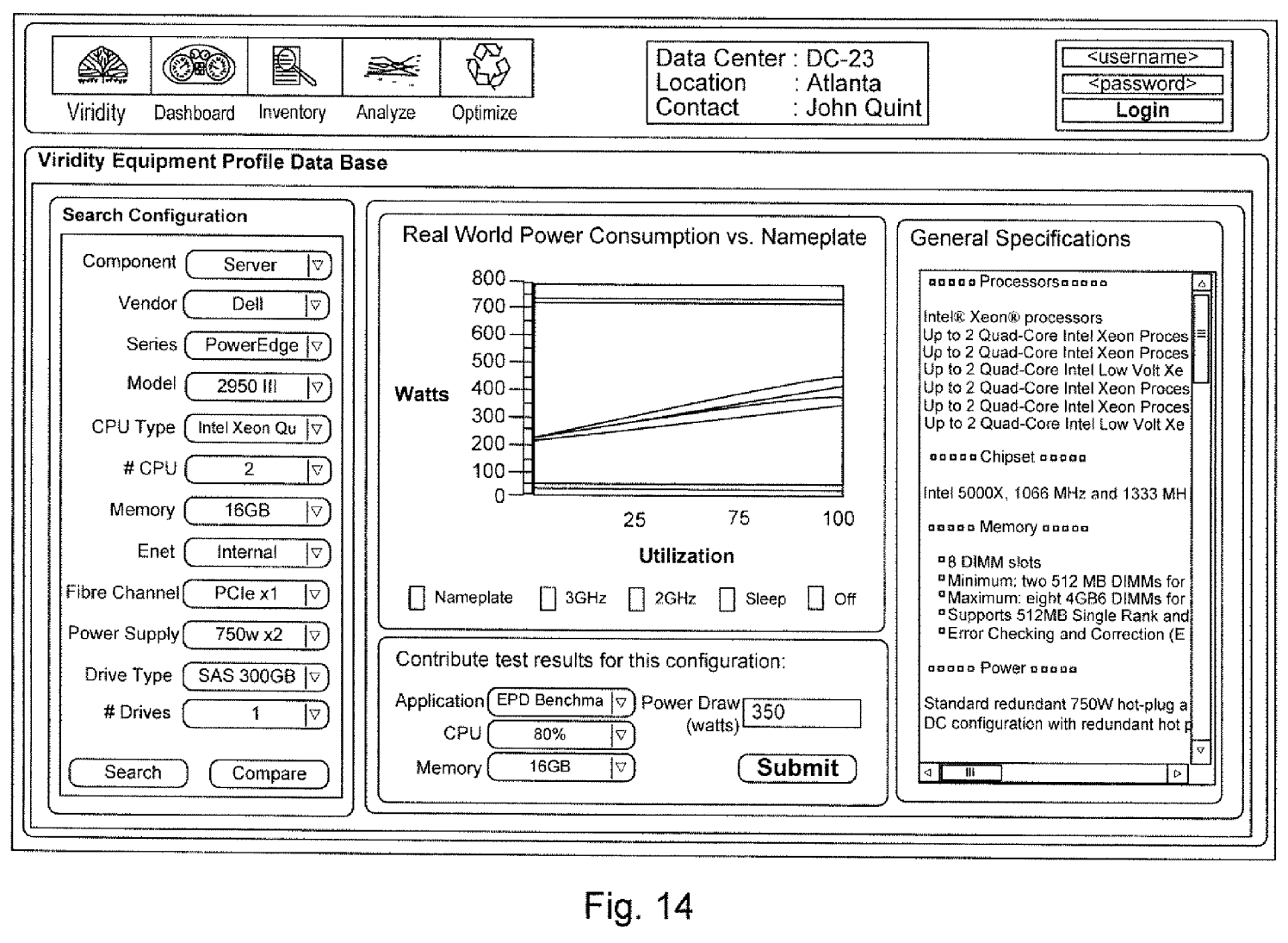

As shown in the exemplary GUI of FIG. 14 the Operations of the data center may be monitored to understand how much power each IT component is consuming at any time.

A database or electronic storage that estimates power draw for different vendor IT equipment (e.g., servers, storage, etc) based on configuration components such as number of CPU cores, memory, etc, in the case of servers may be used. This database may allow automation software to predict power consumption at the equipment level once the data center physical layout and logical IT infrastructure of is known.

A critical use case of this database and instrumentation for deployment may be in the prediction of the actual power consumption by any equipment at any time.

According to some embodiments, understanding the current state of the energy and power consumption may be performed by continuous monitoring of power and cooling energy usage. There may be number of reasons for this:

First, power consumption and cooling specifications listed by the equipment vendors may be the worst-case values. Using a vendor's faceplate numbers can therefore result in high levels of over-provisioning which in turn can result in higher cost of power systems and therefore higher inefficiencies and cost of power delivery.

Second, the levels of power consumption by IT equipment may vary significantly with level of utilization. A 50% swing in power levels may not be unusual when a server shifts from hardly used to fully utilized. When this variation of power consumption is amplified across a large number of servers in the data center, the differences in total power draw can be quite large.

Third, there may be large variations in power draw with relatively small changes in the physical configuration of the servers.

Fourth, accurate power draw measurements may require intrusive instrumentation especially when multiple devices such as servers are drawing power from a single circuit and setting up individual server level meters may not be possible.

Fifth, while estimating power is difficult, predicting the cooling load at different areas of the data center when different IT equipment are placed there is even more challenging. There is currently no good affordable or feasible real-time measure of the cooling load or cost that is associated with each physical area within the data center.

Building an inventory of the physical IT and power resources in the data center may use both manual inspection of the data center and instrumenting the data center. A detailed inventory may be used to measure what power-consuming physical IT equipment has been deployed on the floor. The level of detail may include location, i.e., by location within the server rack, location of the rack in data center by aisles, etc., since energy required for cooling may be dependent on specific locations that may have widely varying thermodynamic profiles.

Figure 15:
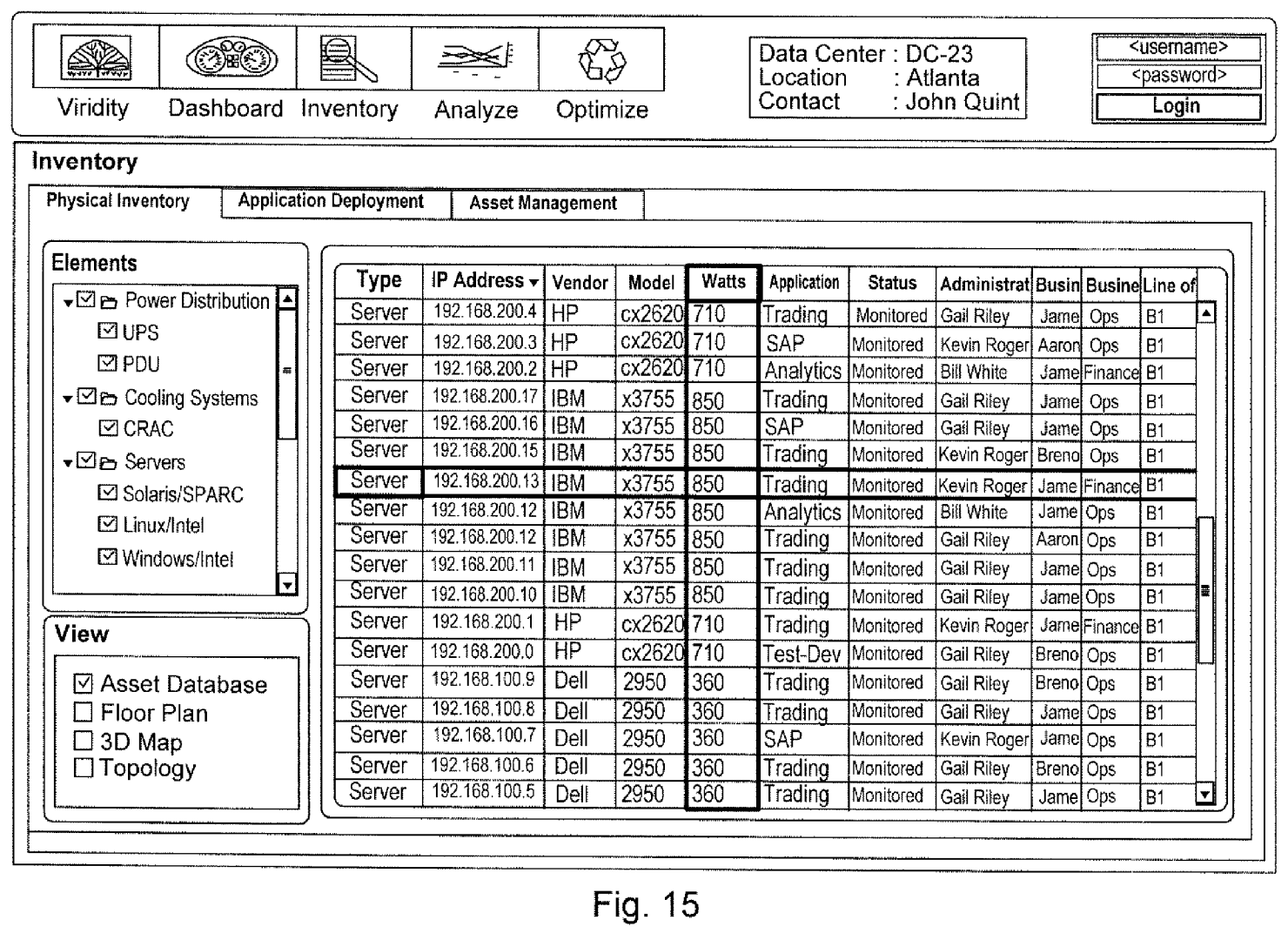

The physical inventory may then be retrieved and searched as show in FIG. 15 where for each server that has been identified by location, instrumentation may be used that measures power consumption with sufficient accuracy. Since the levels of energy savings expected may be in the range of 20%-40%, any instrumentation method that has tolerances of more than a few percent points may be inadequate to accurately characterize operational power consumption and potential for energy savings. Because power consumption is not measured currently at the equipment but at a gross level in the data center, there may be a lack of accurate detailed instrumentation.

Power draw may be estimated at the individual IT equipment (or circuit) level. This new technique may use in-device information to predict power consumed without requiring any special metering or wiring. This may solve two problems:
  First, it may not be possible to set up meters physically to get at individual devices, such as servers within a rack.
  Second, even if instrumentation is possible, some data center owners may be reluctant to allow intrusive instrumentation.

Given these limitations and because there has been no documented approach to solve this problem, this new inferential approach may estimate power consumption at individual device level, independent of the circuit they are on, by reading in other data from the device directly. This may provide device related power, regardless of device configuration.

Once the physical inventory of all IT equipment has been captured, our use of the database may allow identification of what business applications are logically mapped to the physical equipment, e.g., what servers are used for email services.

With this logical tie-in, it may be determined which IT equipment is used for what business critical (or, conversely, business non-essential) applications and whether it is allocated an unfair share of the power budget.

The Physical Plant Simulator may provide a thermal map of the physical plant. However, to estimate the cooling load, the Strategy Selector may use the output of the Physical Plant Simulator and the data center Plant Energy Model.

This estimation may facilitate quantitatively evaluating the total energy impact of any new or changed IT load, and may assist in providing the predictive capability in the energy saving strategy chosen. To the best of our knowledge, while existing approaches to reduce energy in the data center use manual and ad hoc approaches, the present approach may provide an automated and scalable approach to data center energy reduction.

Current measures of energy efficiency in the data center have been very gross and are not helpful in determining specific areas where energy can be saved. This includes the Power Usage Effectiveness (PUE) measure that only indicates what fraction of total power that is used by the data center is used by the IT equipment. This may have severe limitations:

For example, the PUE provides no information on how a hot spot (a zone or region in the data center that is running much hotter than other areas) or cooling inefficiency in a zone is penalizing the cooling cost since that hot spot drives up temperature in neighboring zone that normally would have been cooler. This inefficiency can impose a 20% or larger penalty on cooling costs.

If the PUE cannot isolate localized areas that are causing high inefficiency, it does not indicate which areas of the data center can lead to the most energy savings, and the nature of the inefficiencies.

Because of limited information by current measures of efficiencies, identifying the sources of data center inefficiencies has been a manual process A new quantitative granular efficiencies metric, the "Viridity index" or "V Index" may characterize the data center at units smaller than and within a rack. This may be derived or computed from measurable parameters within the data center. It may quantitatively indicate improvements in energy efficiency after any energy saving strategy has been applied.

A number of different V indexes have been developed including ones on the best placement of IT equipment within the data center, energy efficiency of an IT equipment, and cooling efficiency of any zone in the data center.

As a simple illustration of how the V index would be used consider placement of new IT equipment, a server, within a data center.

FIG. 13 shows the thermal profile of a data center (this was generated by a computationally intensive process called computational fluid dynamics or CFD). Two zones, a hot and a cool zone, are marked on the data center. The simple approach would be to locate the server in the cool zone. However, the placement of a equipment is more complex since it has to account for the cooling cost (efficiency) at that zone, the total power (watts) available in the rack and space.

Using the placement V index, we can automatically determine the best zone in the data center that minimizes the cooling cost while ensuring available power and space constraints, etc. are met.

Figure 16:
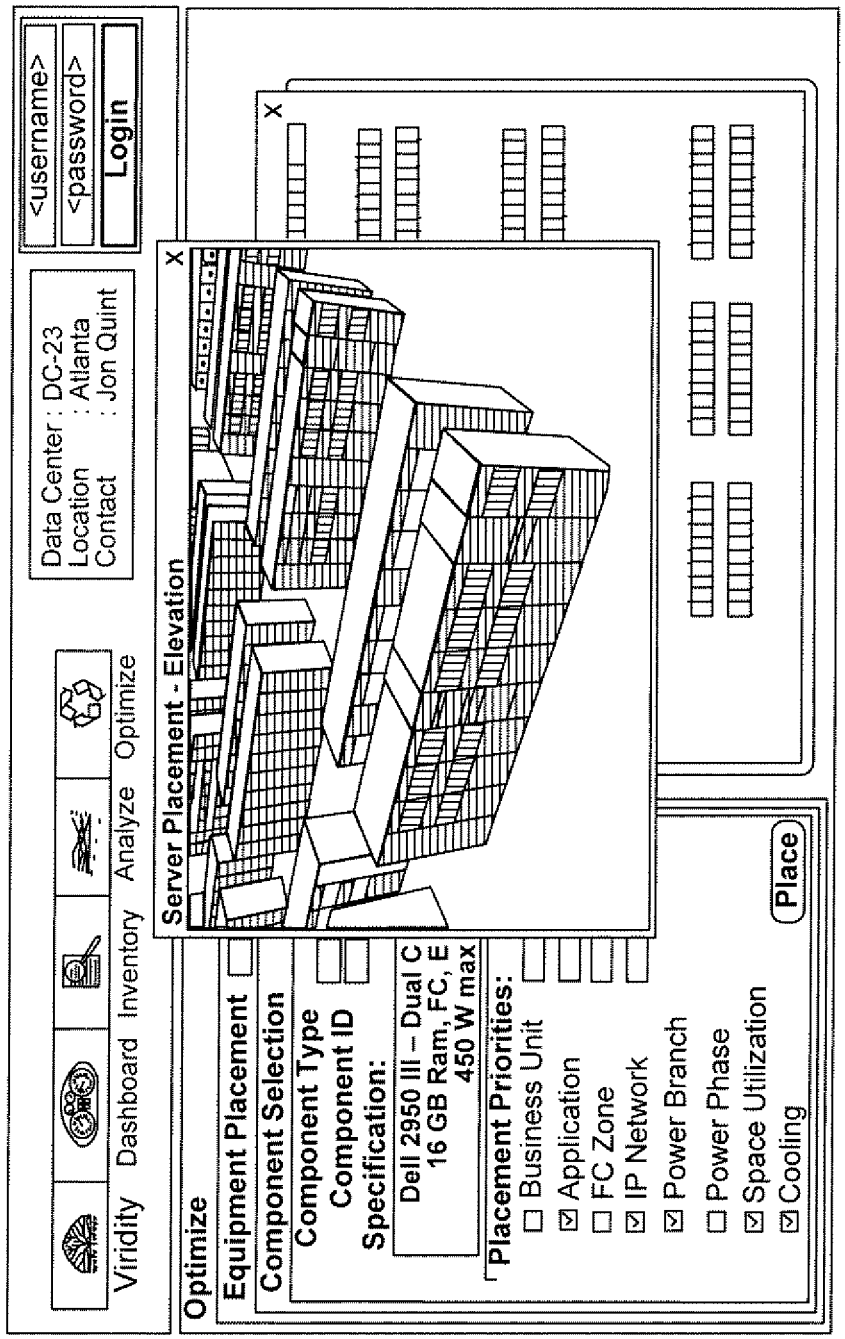
FIG. 16 depicts a user interface for identifying placement of a device in a data center in accordance with an embodiment of the present disclosure.

FIG. 16 shows the visual result of using the V index for optimal placement of the server in the data center. The green areas indicate the ideal location for the server.

As part of the Planning step, a prioritized and viable list of strategies may be provided that can be realized in the data center. This list is used by the Strategy Selector.

Figure 17:
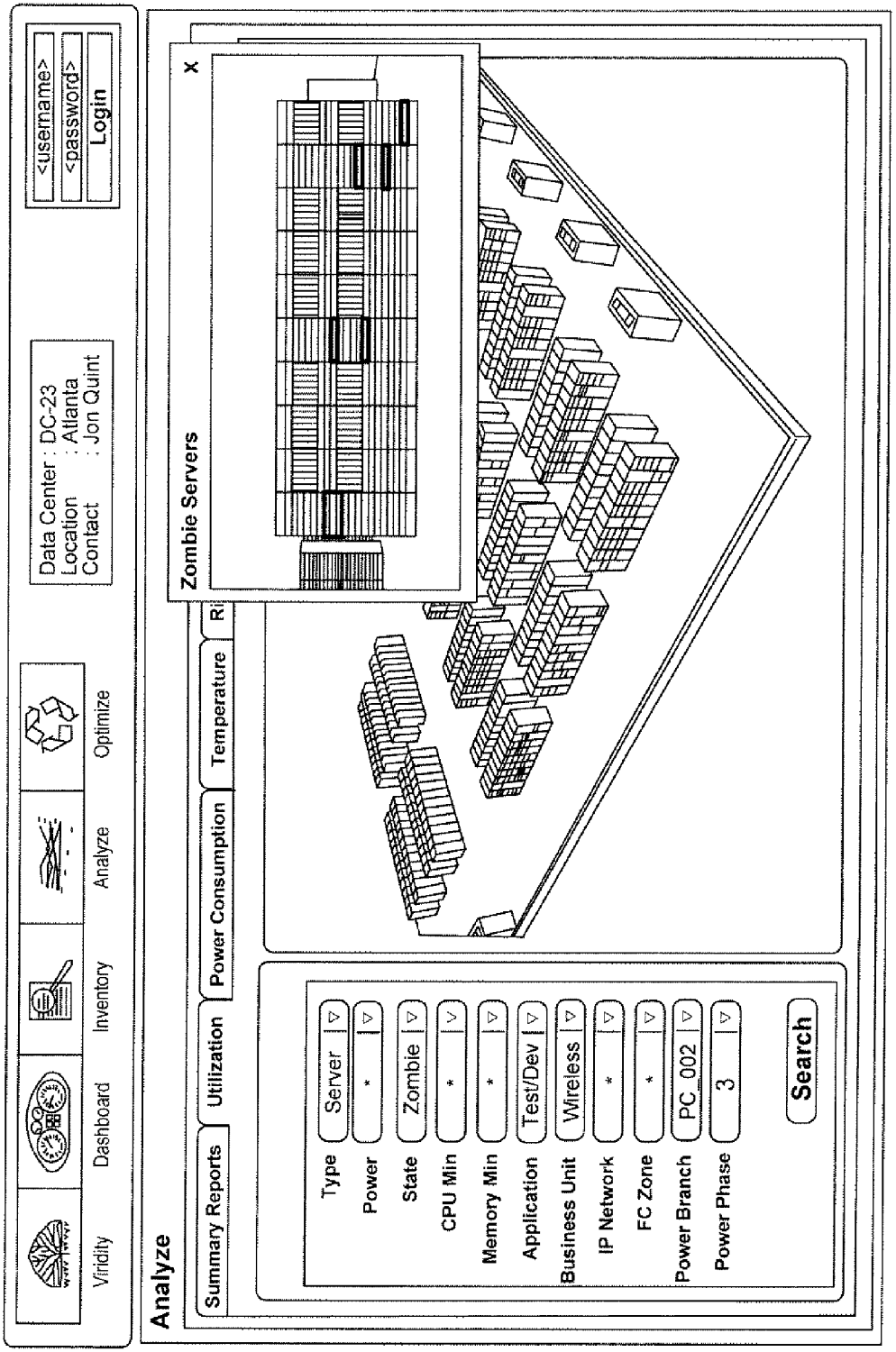
FIG. 17 depicts a user interface for identifying zombies in a data center in accordance with an embodiment of the present disclosure.

FIG. 17 depicts a visualization of the Eliminate Zombie Servers strategy. Red zones indicate location of zombie servers that can be eliminated (e.g., unused servers or other resources not utilized).

A few examples of feasible strategies include:

Hot Spot Elimination:
Identify hot spots may include identifying areas in the data center that are much hotter than other areas. By moving equipment or modifying load, we can reduce the power used (heat generated) or improve cooling (such as airflow). This strategy may result in a lower cooling load and lower costs.

Equipment Placement;
Equipment placement may involve placing new equipment judiciously at colder spots rather than hotter spots to reduce an overall temperature of a datacenter.

Run the data center at hotter temperatures
Running a data center at hotter temperatures may reduce the total cooling load and therefore increase data center power consumption efficiency.

Eliminate Zombie Servers:
By identifying and decommissioning "zombie" servers (i.e., servers that are not be used for any applications in the data center) power consumption and cooling loads may be reduced.

Consolidation of IT resources
Consolidating IT resources so that computing and storage resources have higher capacity, may reduce total power consumed (i.e., KW/unit may be decreased).

Replace less energy-efficient equipment
Replacing less energy-efficient equipment with more energy efficient equipment may reducing total power consumption.

Most of these strategies, whether equipment placement or technology refresh are not simple decisions. They require consideration of:
  i. Mapping the logical IT equipment usage to its current physical location; and
  ii. Constraints on space and available power.

Making changes, whether in placing or relocating new equipment, changes the power load and the associated cooling load locally and in neighboring zones.

Typically, the solution to such a problem, embodied in the Energy Optimizer, requires solving a multi-constraint optimization problem.

According to an embodiment, one approach is to monitor-understand-control energy efficiency across the complete data center.

According to some embodiments, one or more calculations may include indexes incorporating other cost factors including cooling costs. For example, there may be a Viridity Index which may calculate the real cost of a Watt. The Cost of Power may equal IT-power-cost+Cooling-Power-cost+losses. Other calculations may include:
  Cost of Power~PUE*watt_cost;
  Cost of Space=Amortized Cost of Capital for DC/watt; and
  Cost of Over-provisioned Power+Cooling HW/watt=>Excess PDU, Chillers, UPS, UPS Batteries, et al/watt.

Figure 18:
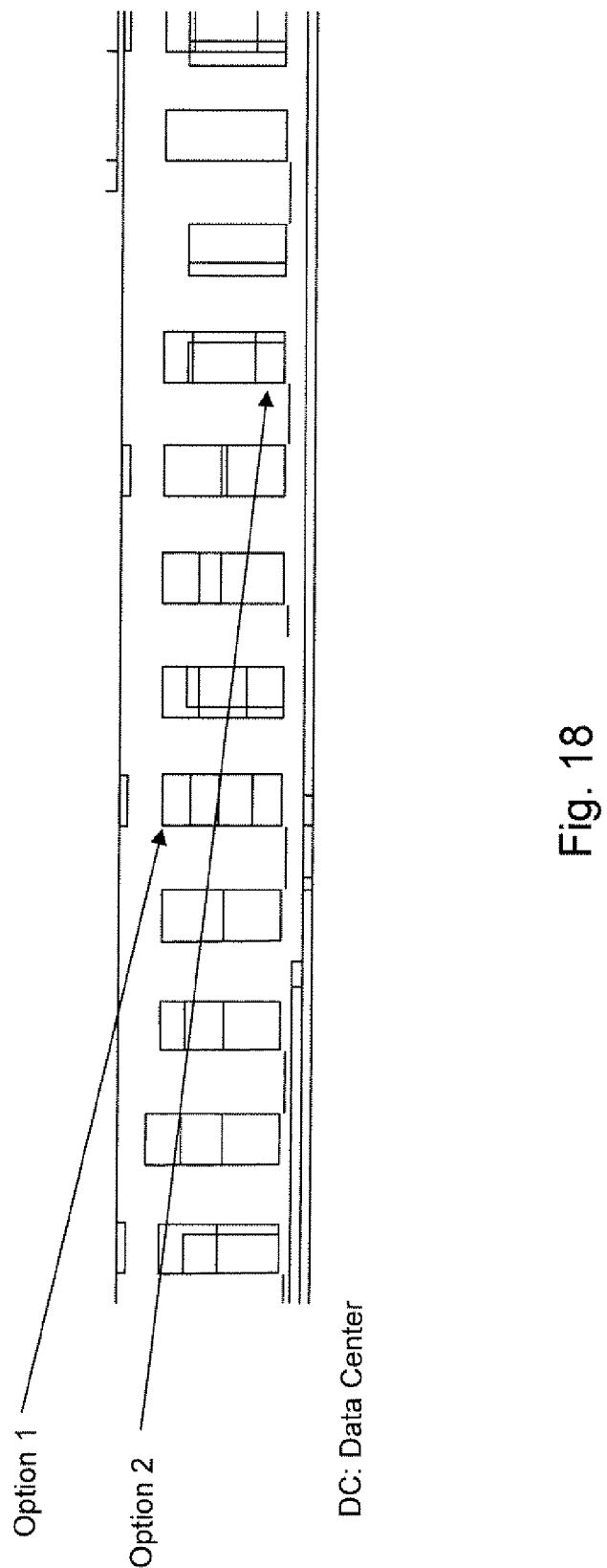
FIG. 18 depicts a thermal map of a data center in accordance with an embodiment of the present disclosure.

Additionally, any IT deployment in a data center may affect: Power, Cooling, Space, and Availability (Reliability). Traditional PUE calculations may not be sufficient. For example, FIG. 18 may be a thermal map representing two different locations for placing equipment in a data center. Option 1 may be a hot location and option 2 may be a cool location. These locations may, according to some embodiments, be identified using computation fluid dynamics. Traditional PUE calculations may be insufficient to identify them.

Figure 20:
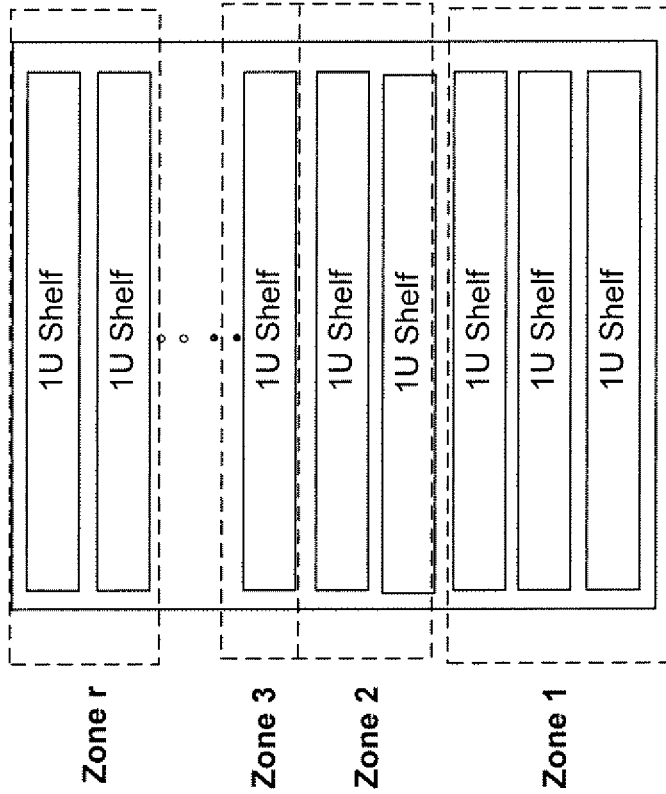
FIG. 20 depicts assignment of one or more resources to zones in a data center in accordance with an embodiment of the present disclosure.
Figure 19:
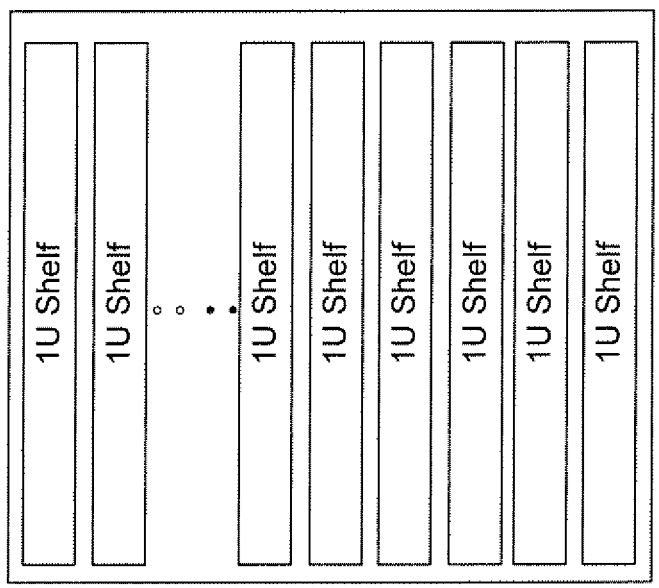
FIG. 19 depicts assignment of one or more resources to zones in a data center in accordance with an embodiment of the present disclosure.

The scope of calculations may be granular: sub-rack level "zones" where equipment can be placed. This may be useful for optimal Placement of equipment. Indicators of Efficiency of the power delivered to the zone (for the work done by the IT equipment). A data center may be decomposed or organized into zones. The granularity of a zone may be less than a rack (e.g., 1U or 2Us across two racks) or greater than or equal to a rack (e.g., several racks.) The bays, slots, or U's may be aggregated into zones. For example, FIG. 19 may be a single rack unit prior to division into zones. FIG. 20 may be an exemplary zone division of the rack unit according to some embodiments. Zones may also span racks and/or encompass one or more racks.

Exemplary indices include:
  $V_t$—Relative Temperature Index/zone
    This is an index which may indicate how to distribute cooling costs across a data center that may be unevenly cooled (e.g., has hot spots).
  $V_w$—Watts Index
    This index indicates the watts used in a particular zone relative to total potential watts provisioned.
  $V_s$—Normalized Space available in zone
    This index indicates available slots (U's) and consecutive slots (U's).
  $V_u$—Utilization of IT Equipment in zone
    To compute this index one first may need to normalize a number of Cores×ClockSpeed×Utilization.
  $V_p$: placement index (cost) of a zone (vector), or Data Center $$V_p = V_t V_w V_s$$

Figure 21:
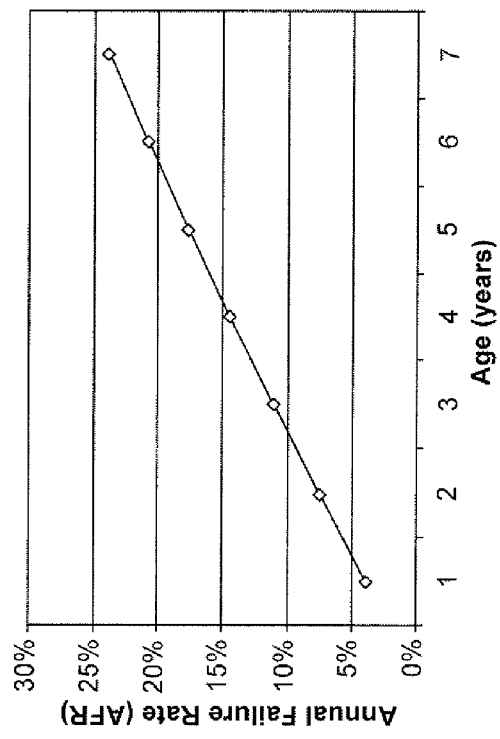
FIG. 21 depicts the relationship between equipment failure and age in a data center in accordance with an embodiment of the present disclosure.
Figure 22:
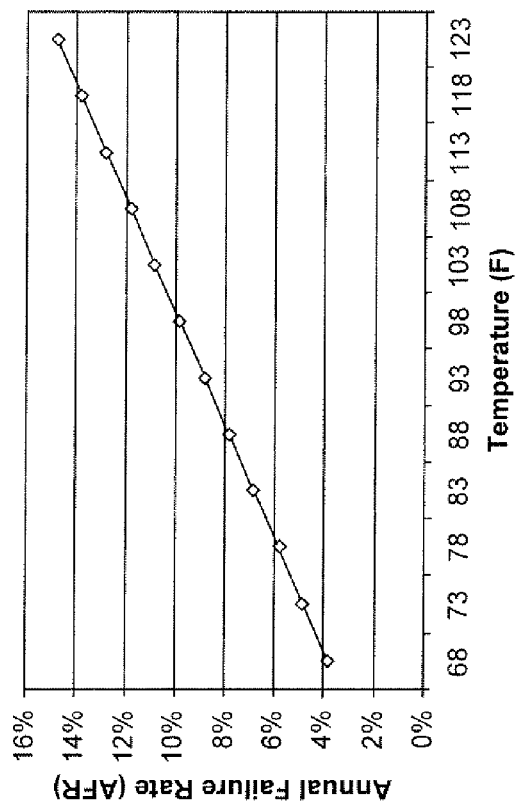
FIG. 22 depicts the relationship between equipment failure and temperature in accordance with an embodiment of the present disclosure.

$V_p$ is a function of the Temperature Index, Watts Index and Space Index.
  Higher value zones may be less desirable locations
  $V_e$: normalized efficiency of IT
    $V_e = f(V_t, V_s)$ (a non-linear function!)
    $V_e$ is a function of IT Utilization and Temperature Index. Lower value zones are less efficient. The Index may be higher when utilization $V_u$ is higher. The index may be lower if thermal index $V_t$ is higher.
  This may be estimated from CPU temperature, GxDB profiles of server, etc.
  $V_r$: reliability index of the IT equipment/zone
    As illustrated in FIG. 21, reliability may depend on age of equipment in the zone. As illustrated in FIG. 22, it may depend on the temperature of the zone—$V_t$.

Thermal indices for placement of equipment may include:
  Global (Data Center-wide) $V_t$
    This may measures imbalance in thermal profiles across a data center (DC).
    This may provide a single numerical value that shows quality of imbalance (esp., cooling inefficiency). This may be related to weighted difference of zone temperatures.

$$V_t = \sqrt{\frac{\sum_i \sum_{j \neq i} (Z_i - Z_j)^2 d_{ij}^{-1/3}}{N}}$$

$Z_i$, $Z_j$: mean temps of zones i and j $d_{ij}$: distance between zones i and j
N: total # zones
Local $V_t$
   This may measure imbalance in thermal profiles for a single zone. This may be a placement cost for any IT equipment in the zone. It may be a relative cost measure.
   This may correlate to a datacenter thermal profile.
Hot spots may be validated with computational fluid dynamics.

$$V_{ti} = \sqrt{\frac{\sum_{j \neq i}(Z_i - Z_j)^2 d_{ij}^{-1/3}}{N-1}}$$

FIG. 23 may be an example of the use of the Global $V_t$ index for comparing two Data Center configurations. There may be sixteen uniform (rack level) zones at different temperatures.

FIG. 24 may be a second example of Global $V_t$. The two data center configurations may contain the same zone temperature set, but with a different distribution.

FIG. 25 may be another example of Local (Zone) $V_t$. Local zone $V_t$ may be a "rent" cost for placing equipment there. It may be higher if a zone temperature has bigger difference than an adjacent zone: this may reflect higher cost of hot-cold air mixing.

In summary, many different energy saving strategies are possible, each working on different parameters and producing different V index.

Energy Saving Strategies

| Strategy | | Parameters/Info Needed | Relevant Index |
|---|---|---|---|
| Placement | Hot Spot Elimination | Measure temps within rack Estimate rack/shelf temp Cooling load of servers | Placement $V_P$ ($V_T$) |
| Placement | Equipment Placement | Zone level temp map Cooling load of equipment (servers) | Placement $V_P$ ($V_T$) |
| Placement | Balanced Power Delivery | | |
| Reduce Watts | Run Data Center Hot | Server AFR (Average Failure Rate)/MTBF (Mean Time Between Failures) Degradation of server MTBF with respect to temperature Change in cooling load with respect to temperature | Reliability, Watts $V_R$, $V_W$ |
| Reduce Watts | Eliminate Zombie Servers | Key apps running in DC App to Server map-gross level | Utilization, Watts $V_U$, $V_W$ |
| Reduce Watts | Power and Cooling Best Practices | | $V_W$, $V_T$ |
| Reduce Watts | Consolidation | New equipment specs Application performance needs | Utilization, Watts, Space $V_U$, $V_W$, $V_S$ |
| Better Equipment | Technology Refresh | DC policy on tech refresh/replacement New equipment specs | Utilization, Watts $V_U$, $V_W$ |
| Better Equipment | Technology Refresh Equipment Placement | Combination of #6, #7 | Placement, Utilization, Watts, Space $V_U$, $V_W$, $V_S$, $V_P$ |
| Better Equipment | Tiered Storage | | |

By balancing power, cooling, and utilization data center agility may be restored. This may free up resources, enhance service levels and responsiveness, and extending the life of the data center.

According to some embodiments only software may be used at the data center. No additional sensors or agents may be required. Use of standard protocols and APIs may provide Multi-vendor support. Aggregation of data may be provided across many data sources.

This may increase power utilization at the data center, circuit, and rack level. This may provide an integrated understanding of the physical and logical layers of the data center. This may allow the development of power accounting (charge-backs) at the server, application, and business level. It may allow SLAs (Service Level Agreements) to be informed with better risk and availability analysis, improve tactical optimization and strategic planning, and enable data center efficiency management.

The power and temperature analysis techniques discussed may provide real world component power/cooling consumption, real time power management, real time cooling management, trend line and predictive analysis, charge-back capability, tactical equipment placement, risk and availability management, and efficiency optimization system and simulation.

According to some embodiments, one or more of the power and temperature analysis techniques discussed may be provided under a software as a service model. There may be different pricing models. Regular updates to power and heat models may be provided. According to some embodiments, the techniques may be subscription priced on number of managed components by data center. The cost may scale by module.

Figure 30:
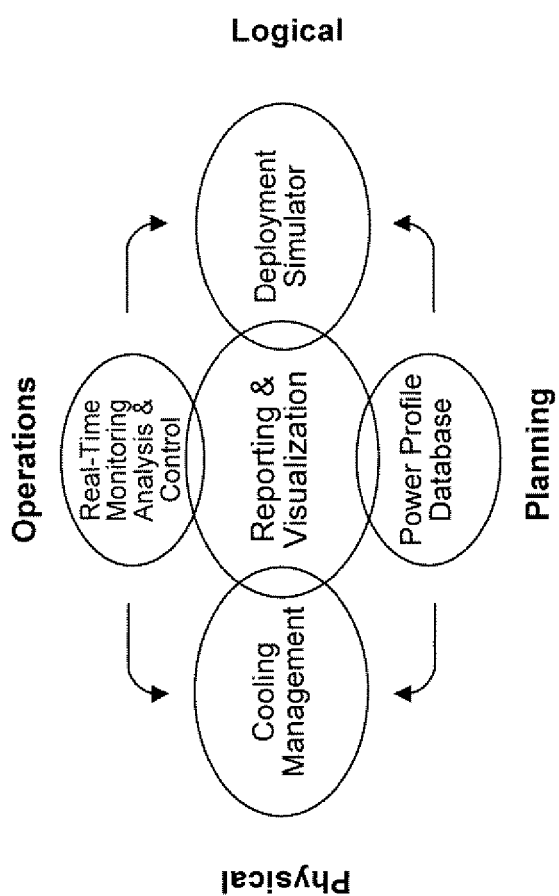
FIG. 30 depicts a high level overview of techniques for data center optimization in accordance with an embodiment of the present disclosure

FIGS. 26-29 may provide exemplary monitoring, reporting, and management screens. FIG. 30 may provide a high level overview of one or more embodiments of the techniques discussed herein.

At this point it should be noted that techniques for power analysis of data centers in accordance with the present disclosure as described above typically involves the processing of input data and the generation of output data to some extent. This input data processing and output data generation may be implemented in hardware or software. For example, specific electronic components may be employed in a data center power analysis module or similar or related circuitry for implementing the functions associated with data center power analysis in accordance with the present disclosure as described above. Alternatively, one or more processors operating in accordance with instructions may implement the functions associated with data center power analysis in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for power analysis of a plurality of computing platform components, the method comprising:
   discovering one or more logical elements associated with at least one physical component of the plurality of computing platform components, the one or more logical elements including at least one of an operating system component associated with the at least one physical component and a virtual machine associated with the at least one physical component;
   executing, by a computer processor, a process for each physical component of the plurality of computing platform components, the process including:
      receiving information associated with the physical component;
      retrieving electronically stored data associated with the physical component, the data including at least power consumption data; and
      estimating an estimated power usage of the physical component based at least in part on the stored power consumption data and any logical elements associated with the physical component;
   aggregating the estimated power usage of each physical component of the plurality of computing platform components;
   outputting an indicator of the estimated power usage of the plurality of computing platform components;
   analyzing the estimated power usage of the plurality of computing platform components;
   identifying one or more problems responsive to analyzing the estimated power usage of the plurality of computing platform components;
   generating one or more suggestions to solve the identified one or more problems; and
   identifying and illustrating the impact of the one or more suggestions.

2. The method of claim 1, wherein the physical component comprises at least one of a computer processor, electronic storage, and a networking component.

3. The method of claim 1, wherein aggregating the estimated power usage of each physical component includes aggregating the estimated power usage of each physical component included within a device, the device comprising at least one of a server, a network device, a host, and a storage device.

4. The method of claim 1, further comprising iterating through the process for a plurality of devices in a zone.

5. The method of claim 1, further comprising:
   receiving one or more measurements associated with at least one physical component of the plurality of computing platform components; and
   estimating power usage of the at least one physical component based at least in part on the one or more received measurements.

6. The method of claim 5, wherein receiving the one or more measurements comprises receiving at least one of a reading from a temperature sensor, a processor chip, a heat sink, a disk controller, a power supply, and a network component.

7. The method of claim 5, wherein receiving the one or more measurements comprises receiving at least one of CPU utilization, transaction rates, communication rates, configuration information, active processes, and a number of virtual machines.

8. The method of claim 1, further comprising estimating a thermal profile of at least one physical component of the plurality of computing platform components based at least in part on one or more of the estimated power usage of the physical component and one or more received measurements.

9. The method of claim 8, further comprising estimating an estimated power requirement based on the thermal profile.

10. The method of claim 9, wherein estimating the estimated power requirement based on the thermal profile comprises using the thermal profile to estimate a cooling cost.

11. The method of claim 8, wherein estimating the thermal profile includes estimating the thermal profile using Computational Fluid Dynamics.

12. The method of claim 1, further comprising receiving one or more measurements from at least one of a power distribution unit and a computer room air conditioner.

13. The method of claim 12, further comprising using the one or more measurements to estimate at least one of power usage and a thermal profile.

14. The method of claim 1, further comprising accepting input for an unrecognized component in the event electronically stored data associated with the unrecognized component is not retrieved.

15. The method of claim 1, wherein retrieving the electronically stored data associated with the physical component comprises retrieving the electronically stored data from a database of at least one of profiles of components, server arrays, computer room air conditioners, power distribution units, and data center physical infrastructure.

16. The method of claim 1, wherein generating the one or more suggestions includes generating the one or more suggestions based on at least one of an estimated power usage of at least one physical component of the plurality of computing platform components, an estimated power usage of the device, estimated power usage of a zone, an estimated power usage of a data center, a thermal profile of a zone, and a thermal profile of the data center.

17. The method of claim 16, wherein generating the one or more suggestions further includes generating one or more suggestions to include at least one of eliminating unutilized physical components, consolidating under-utilized physical components, upgrading inefficient physical components, rearranging physical components within a geographical location to improve a thermal profile, and redistributing a work load across physical components within the data center to improve the thermal profile of the data center.

18. At least one non-transitory processor readable storage medium for storing a computer program of instructions configured to be readable by at least one processor for instructing the at least one processor to execute a computer process for performing the method as recited in claim 1.

19. The method of claim 1, wherein receiving information associated with the physical component comprises discovering the physical component via a network interface.

20. The method of claim 19, wherein discovering the physical component via the network interface comprises using at least one of Simple Network Management Protocol (SNMP), Storage Management Initiative-Specification (SMI-S), Intelligent Platform Management Interface (IPMI), Windows Management Instrumentation (WMI), Secure Shell (SSH), BACNet, and ModBus.

21. The method of claim 19, wherein discovering the physical component via the network interface comprises discovery performed on a data center from a remote location.

22. The method of claim 1, further comprising estimating a thermal profile of at least one physical component of the plurality of computing platform components within a geographical location and wherein generating the one or more suggestions includes generating the one or more suggestions including at least one of eliminating one or more physical components, consolidating one or more physical components, upgrading one or more physical components, and rearranging one or more physical components within the geographical location to improve the thermal profile.

23. The method of claim 22, wherein the geographical location is a data center.

24. An article of manufacture for power analysis of a plurality of computing platform components, the article of manufacture comprising:
  at least one non-transitory processor readable medium; and
  instructions stored on the at least one non-transitory processor readable medium;
  wherein the instructions are configured to be readable from the at least one medium by at least one processor and thereby cause the at least one processor to operate so as to:
  discover one or more logical elements associated with at least one physical component of the plurality of computing platform components, the one or more logical elements including at least one of an operating system component associated with the at least one physical component and a virtual machine associated with the at least one physical component;
  execute a process for each physical component of the plurality of computing platform components, the process including:
    receiving information associated with the physical component;
    retrieving electronically stored data associated with the physical component including at least power consumption data; and
    estimating an estimated power usage of the physical component based at least in part on the stored power consumption data and any logical elements associated with the physical component;
  aggregate the estimated power usage of each physical component of the plurality of computing platform components;
  output an indicator of the estimated power usage of the plurality of computing platform components;
  analyze the estimated power usage of the plurality of computing platform components;
  identify one or more problems responsive to analyzing the estimated power usage of the plurality of computing platform components;
  generate one or more suggestions to solve the identified one or more problems; and
  identify and illustrating the impact of the one or more suggestions.

25. A system for power analysis of a plurality of computing platform components, the system comprising one or more processors communicatively coupled to a network, wherein the one or more processors are configured to:
  discover one or more logical elements associated with at least one physical component of the plurality of computing platform components, the one or more logical elements including at least one of an operating system component associated with the at least one physical component and a virtual machine associated with the at least one physical component;
  execute a process for each physical component of the plurality of computing platform components, the process being configured to at least:
    receive information associated with the physical component;
    retrieve electronically stored data associated with the physical component including at least power consumption data; and
    estimate an estimated power usage of the physical component based at least in part on the stored power consumption data and any logical elements associated with the physical component;
  aggregate the estimated power usage of each physical component of the plurality of computing platform components;
  output an indicator of the estimated power usage of the plurality of computing platform components;
  analyze the estimated power usage of the plurality of computing platform components;
  identify one or more problems responsive to analyzing the estimated power usage of the plurality of computing platform components;
  generate one or more suggestions to solve the identified one or more problems; and
  identify and illustrate the impact of the one or more suggestions.

* * * * *